US012760998B2

(12) United States Patent
Davidson et al.

(10) Patent No.: US 12,760,998 B2
(45) Date of Patent: Oct. 13, 2026

(54) ELECTRONIC DISPLAY FOR A RIFLE SCOPE TURRET

(71) Applicant: GUNWERKS, LLC, Cody, WY (US)

(72) Inventors: Aaron Davidson, Burlington, WY (US); Haizhou Li, Austin, TX (US)

(73) Assignee: GUNWERKS, LLC, Cody, WY (US)

( * ) Notice: Subject to any disclaimer, the term of this patent is extended or adjusted under 35 U.S.C. 154(b) by 1169 days.

(21) Appl. No.: 17/831,183

(22) Filed: Jun. 2, 2022

(65) Prior Publication Data

US 2023/0392900 A1 Dec. 7, 2023

(51) Int. Cl.
*F41G 3/26* (2006.01)
*F41G 1/38* (2006.01)
*G02F 1/167* (2019.01)

(52) U.S. Cl.
CPC ............. *F41G 3/2633* (2013.01); *F41G 1/38* (2013.01); *F41G 3/2644* (2013.01); *G02F 1/167* (2013.01)

(58) Field of Classification Search
CPC ........ F41G 3/2633; F41G 1/38; F41G 3/2644; G02F 1/167
See application file for complete search history.

(56) References Cited

U.S. PATENT DOCUMENTS 4,561,204 A 12/1985 Binion
5,303,495 A 4/1994 Harthcock
6,862,832 B2 3/2005 Barrett
7,325,353 B2 2/2008 Cole et al.
7,421,816 B2 9/2008 Conescu
7,530,193 B2 5/2009 Williamson et al.
7,574,825 B2 8/2009 Lacorte
7,643,132 B2 1/2010 Holmberg
7,926,219 B2 4/2011 Reimer
8,001,714 B2 8/2011 Davidson
8,201,741 B2 6/2012 Bennetts et al.
8,416,493 B1 4/2013 Brown et al.
8,713,843 B2 5/2014 Windauer
9,080,839 B2 7/2015 Arachequesne
9,175,927 B2 11/2015 Tubb
9,291,424 B2 3/2016 Tagarro
9,885,541 B2 2/2018 Meinert et al.
9,915,503 B2 3/2018 Davidson
10,101,122 B2 10/2018 Davidson et al.
(Continued)

FOREIGN PATENT DOCUMENTS

WO 2021022170 A1 2/2021

OTHER PUBLICATIONS

"Digital Infrared Rifle Scope 4.3" Monitor HD 720P Screen with Flashlight Torch".

(Continued)

*Primary Examiner* — Seung C Sohn

(74) *Attorney, Agent, or Firm* — DORSEY & WHITNEY LLP

(57) ABSTRACT

A turret of a scope can include a cap, a turret body connected to the cap, an electronic display wrapped circumferentially around the turret body, and a button positioned on or through a surface of the cap to engage the electronic display. In certain implementations, upon depressing the button, the electronic display presents a graphical visualization. In addition, the graphical visualization can include at least one of distance compensation data, a ballistic profile, or environmental conditions.

15 Claims, 15 Drawing Sheets

(56) References Cited

U.S. PATENT DOCUMENTS

| | | | | |
|---|---|---|---|---|
| 10,267,598 | B2 | 4/2019 | Fougnies et al. | |
| 10,337,830 | B2 | 7/2019 | Mchale et al. | |
| 10,648,773 | B2 * | 5/2020 | Owens | F41G 1/38 |
| 10,767,962 | B2 | 9/2020 | York et al. | |
| 10,782,517 | B2 | 9/2020 | Lv | |
| 11,006,746 | B2 | 5/2021 | Smith | |
| 11,047,646 | B2 | 6/2021 | Libotte | |
| 11,087,512 | B2 | 8/2021 | Hoffman | |
| 11,209,243 | B1 | 12/2021 | Masarik et al. | |
| 2003/0145505 | A1 | 8/2003 | Kenton | |
| 2004/0025396 | A1 | 2/2004 | Schlierbach et al. | |
| 2004/0148841 | A1 | 8/2004 | Burzel | |
| 2004/0231220 | A1 | 11/2004 | McCormick | |
| 2009/0227372 | A1 | 9/2009 | Yang | |
| 2010/0251593 | A1 | 10/2010 | Backlund et al. | |
| 2014/0182187 | A1 | 7/2014 | Mchale | |
| 2014/0184476 | A1 | 7/2014 | Mchale et al. | |
| 2014/0268187 | A1 | 9/2014 | Nichols | |
| 2016/0324014 | A1 * | 11/2016 | Lee | H05K 1/028 |
| 2017/0141168 | A1 * | 5/2017 | Choi | H10K 77/111 |
| 2019/0377171 | A1 | 12/2019 | Hammond et al. | |
| 2020/0191527 | A1 * | 6/2020 | Roman | F41G 3/2605 |
| 2021/0071993 | A1 | 3/2021 | Baggio et al. | |

OTHER PUBLICATIONS

"G1T3™ System", https://sectoroptics.com/product/g1t3-system/.

"Israeli Firm Unveils Smartphone-Style Digital Rifle Sight", https://www.military.com/kitup/2019/01/29/israeli-firm-unveils-smartphone-style-digital-rifle-sight.html, Jan. 29, 2019.

"Riflescope Nightvision Digital Infrared Battery Monitor Flashlight Hunting Scope", https://onlinenightvision.com/en/riflescope_nightvision_digital_infrared_battery_monitor_flashlight_hunting_scope.php.

"Scope optical sight Leupold® Mark IV with BORS®", https://www.turbosquid.com/3d-models/3ds-max-leupold%C2%AE-mark-iv-bors%C2%AE/509750.

* cited by examiner

ELECTRONIC DISPLAY FOR A RIFLE SCOPE TURRET

FIELD

The described embodiments relate generally to scopes (e.g., rifle scopes or crossbow scopes). More particularly, the present embodiments relate to a turret of a scope (e.g., an elevation turret, windage turret, or parallax turret).

BACKGROUND

Scopes are common optic devices used with guns, crossbows, and other devices capable of firing or launching a projectile to aid a user's perception of a target. Such scopes can be mounted to a gun or crossbow, as examples, to help a user perceive a target positioned tens, hundreds, or (as applicable for some rifles) over a thousand yards away from the user. However, merely perceiving the target through the scope is insufficient for an accurate shot. In particular, a projectile (e.g., a bullet or arrow) will often travel a path that is non-linear as the projectile travels in the air over a distance toward the target. In other terms, the projectile will be subject to the effects of gravity, wind, and other factors (e.g., elevation, pressure, temperature, etc.) such that the projectile does not travel in a straight line from the user to the target.

Scopes typically include mechanisms to account for these effects. For example, an elevation turret on a scope can be used to compensate or adjust for an amount of vertical drop that a projectile will undergo at a given distance to an intended target. Similarly, a windage turret on a scope can be used to compensate or adjust for an amount of horizontal variance that a projectile will undergo at a given distance to an intended target. To illustrate, a user can turn an elevation turret on a scope a certain number of clicks (e.g., minutes of angle or milliradians) to adjust the optical system of the scope so that cross-hairs or another visual indicator of the scope reticle aligns with a true point of impact where the projectile will hit the intended target.

The amount of adjustment (e.g., turret clicks or turns) depends on myriad different factors. Environmental factors mentioned above and projectile-specific factors can affect trajectory. For instance, a trajectory for a bullet shot from a rifle or other firearm (e.g., pistol, muzzleloader, etc.) can be affected by elements of a ballistic profile, such as the bullet shape and weight, ammunition load (e.g., grain), muzzle velocity, drag coefficient, etc. As another example, broadhead weight and type, arrow shaft weight, and fletching can affect the trajectory of an arrow.

Certain devices can be utilized to determine the amount of adjustment given the above-mentioned factors. For example, binoculars, range finders, mobile devices, etc. can implement hardware and/or software to determine the amount of adjustment for a particular ballistic profile, distance to a target, and/or environmental factors. Additionally or alternatively, some product manuals (e.g., for a firearm or ammunition) can provide a recommended adjustment for certain factors.

Based on a ballistic profile (or other factor, such as target distance), a user can then implement the appropriate adjustment via a corresponding number of clicks or turns at a turret on the scope. Often, however, there can be user error in implementing a turret adjustment based on information from a separate device or manual. For instance, many users often forget or misremember the information presented on an external device when the user directs their attention to the scope turret to implement a specific number of clicks or turns. This lends to a poor user experience. More particularly, inaccurate translation of the information to a turret adjustment can lead to an inaccurate shot. These disadvantages can be especially acute in intense, time-sensitive situations, such as a shooting competition, military strike, or opportunity to harvest an animal.

To this end, some conventional scope turrets are laser-marked or otherwise etched to include permanent markings specific to a particular gun and ballistic profile. However, this approach presents other issues. In particular, such an approach is overly rigid because even minor changes to a ballistic parameter (e.g., a different grain, brand of gun powder, different bullet type, etc.) can nullify the accuracy of the markings on a laser-marked scope turret. The laser-marked turret can then become obsolete. Accordingly, there is a need to improve a scope turret for flexibly adjusting its markings to suit different ballistic profiles and parameters. Additionally, there is a need to improve a scope turret for efficient, accurate user adjustment based on data identified by a separate, external device.

The subject matter claimed herein is not limited to embodiments that solve any disadvantages or that operate only in environments such as those described above. Rather, this background is only provided to illustrate one example technology area where some embodiments described herein may be practiced.

SUMMARY

An aspect of the present disclosure relates to a scope. In some embodiments, the scope includes an optical assembly, a windage turret to laterally adjust the optical assembly, and an elevation turret to vertically adjust the optical assembly. In certain implementations, the elevation turret includes a digital display configured to present graphical visualizations, where the digital display is rotatably coupled with the elevation turret to rotate together.

In some embodiments, the elevation turret further includes a cap, a turret body connected to the cap, a button positioned on or through a top surface of the cap, a printed circuit board (PCB) electrically or mechanically coupled to the button, and a battery providing power to the digital display via the PCB. In certain embodiments, interaction with the button causes the PCB to engage the digital display.

In one or more embodiments, the elevation turret further includes a connector assembly coupling the digital display and the PCB. In some embodiments, the connector assembly includes a display mount attached to the PCB, and a flex connection between the display mount and the digital display. In certain implementations, the digital display is coupled to a side surface of the elevation turret. In some embodiments, the digital display spans an entire circumference of the elevation turret. In particular embodiments, the digital display presents at least one of numbers or hash marks representing adjustment metrics to the optical assembly in milliradians or minutes of angle. In one or more embodiments, the digital display presents at least one of a rifle caliber, an ammunition load, or an environmental condition.

Another aspect of the present disclosure relates to a scope display system. In some embodiments, the scope display system includes a graphical user interface affixed to an exterior surface of a rotatable scope element, the graphical user interface configured to present at least one of distance compensation data or a ballistic profile. Additionally, in some embodiments, the scope display system includes one or more processors integrated with a printed circuit board (PCB), the PCB being disposed inside of the rotatable scope element. Further, in some embodiments, the scope display system includes a connector assembly to communicatively couple the one or more processors and the graphical user interface.

In one or more embodiments, the graphical user interface is responsive to digital communication from a client device connected (e.g., communicatively coupled) to the one or more processors. In particular embodiments, the graphical user interface presents updated distance compensation data from the client device in response to changes in environmental conditions. In some embodiments, the one or more processors comprise a memory device that stores the distance compensation data or the ballistic profile. Further, in some embodiments, the connector assembly includes a display mount attached to the PCB, and a connection prong affixed to the graphical user interface, the connection prong being sized and shaped to insert into the display mount.

Yet another aspect of the present disclosure relates to a turret of a scope. In some embodiments, the turret of a scope includes a cap, a turret body connected to the cap, an electronic display wrapped circumferentially around the turret body, and an actuator to engage the electronic display. In some embodiments, the actuator is a button. In particular embodiments, upon depressing the button, the electronic display presents a graphical visualization. In certain embodiments, the graphical visualization includes at least one of distance compensation data or a ballistic profile. Further, in some embodiments, the graphical visualization comprises multiple ballistic profiles, at least one ballistic profile being selectable via additional user interaction with the button.

In some embodiments, upon actuating the actuator, the electronic display powers on and becomes wirelessly connectable with an external device. In one or more embodiments, upon being wirelessly connected, the electronic display presents a graphical visualization based on distance compensation data or a ballistic profile received from the external device. In certain embodiments, the electronic display comprises an electronic ink interface.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
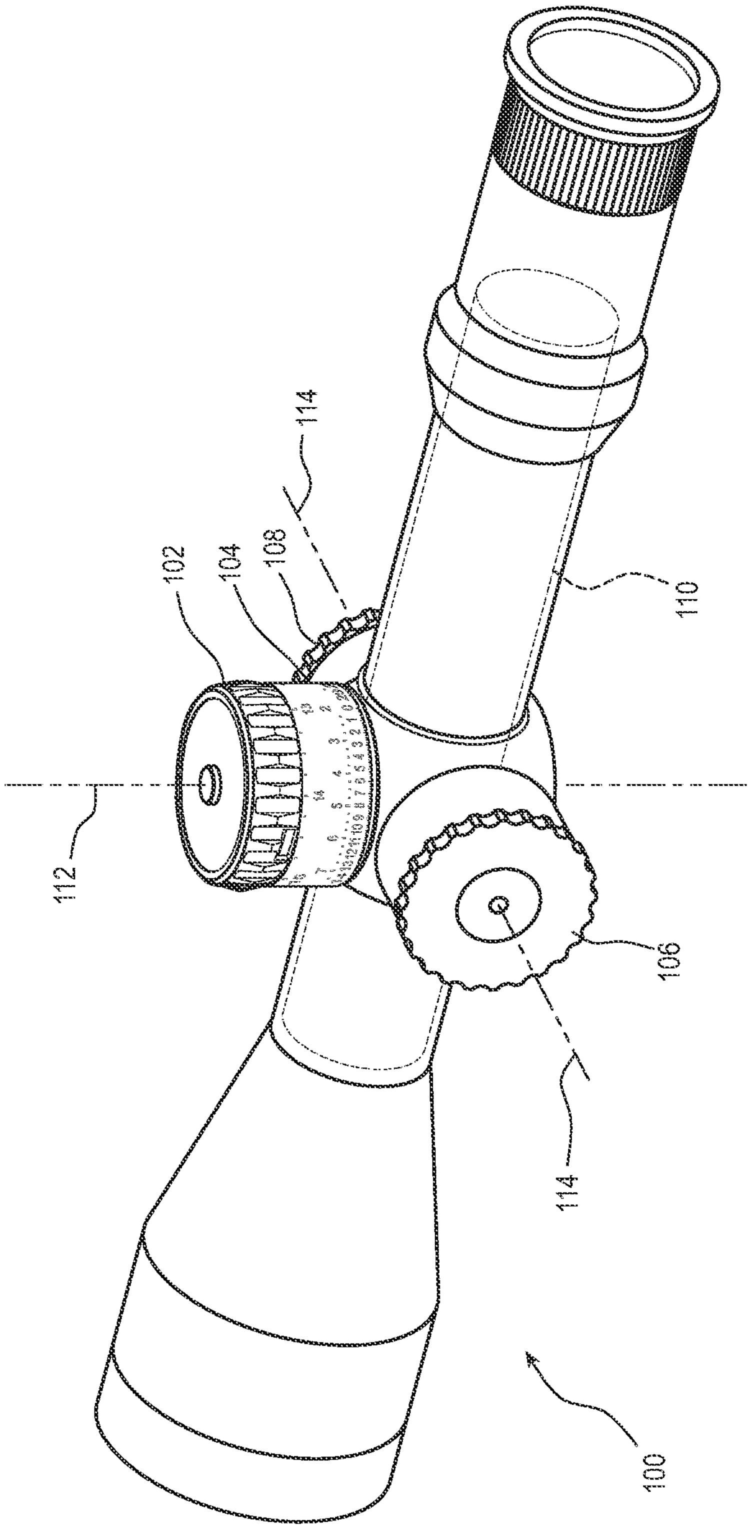
FIG. 1 illustrates a perspective view of an example scope.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to an electronic display for a scope turret. In one example, a scope turret includes a rotatable element of a scope configured to adjust an optical assembly (e.g., an erector tube with one or more lenses, optical elements, and an aiming reticle). For instance, a scope turret can include an elevation turret, a windage turret, or a parallax turret.

In some embodiments, the scope turret includes an electronic or digital display. In one example, the electronic display can include an electronic ink (e-ink) interface. A myriad of other types of displays are herein contemplated. In some embodiments, the electronic display can be an interactive display (e.g., responsive to haptic inputs detected at the display or actuation of an actuator communicatively coupled to the display). The electronic display can also be interactive in response to updated or new environmental conditions identified by an external device (as discussed below). Those skilled in the art will appreciate that the electronic display can be compatible with certain power constraints (e.g., battery sizes, power consumption, use durations, etc.). Further, those skilled in the art will appreciate that the electronic display can also be compatible with and visible in outdoor conditions commonly exposed to a scope (e.g., broad daylight, low light, rain, snow, dust, debris, etc.).

In particular embodiments, the electronic display of the scope turret can present graphical visualizations. For example, the electronic display can present a ballistic profile (or a selectable menu of multiple ballistic profiles). As another example, the electronic display can present distance compensation data for one or more target distances (e.g., bullet drop compensation ("BDC") in minutes of angle or milliradians). In another example, the electronic display can present environmental conditions detected by the external device (e.g., pressure, temperature, humidity level, coordinate location, compass heading, elevation, wind speed, wind direction, inclination or angle to target, distance to target, etc.). In yet another example, the electronic display can present numbers or hash marks representing adjustment metrics to the optical assembly in milliradians or minutes of angle (e.g., for a given target distance). Still further, the electronic display can present one or more settings for the scope turret (e.g., display settings, reticle zero settings, etc.).

The electronic display can present these or other graphical visualizations based on one or more memory devices coupled to or integrated with the electronic display. Additionally or alternatively, the electronic display can present graphical visualizations in response to data packets received from an external device (e.g., a mobile device, range finder, binoculars, spotting scope, etc.). To illustrate, the scope turret can wirelessly connect with an external device via a BlueTooth® or other suitable wireless connection. Via a connection (whether wired or wireless), one or more processors of the scope turret can receive a digital data packet that includes at least one of distance compensation data, a ballistic profile, or environmental conditions.

As discussed in the Background section above, a user often implements a presentation of data on an external device to correspondingly adjust a conventional turret. During this process, users often inadvertently transpose or omit data values, thereby creating an inaccurate and inefficient method to adjust a scope turret. To that end, some users cross-check (e.g., go back and forth) between the external device and the conventional scope turret to avoid user error when adjusting the conventional scope turret. Many times, the conventional turret adjustment process can also include added complexity (and further adjustment) as environmental conditions change in real time. The turret adjustment process for conventional scope turrets can therefore become a time-consuming and frustrating process, especially when erroneously performed.

Further, some conventional scope turrets include permanent markings for a specific ballistic profile. As also discussed in the Background section, this inflexible approach to a scope turret design does not allow changes to ballistic profiles or the implementation of different ballistic profiles.

In contrast to conventional scope turrets, the disclosed scope turret with an electronic display can provide a number of advantages. For example, the disclosed scope turret can leverage a wireless (or wired) connection to an external device to provide an accurate, highly visible, and convenient graphical presentation on the scope turret itself. For instance, the graphical presentation can be referenced from the scope turret when simultaneously adjusting the scope turret. The user need not cross-check the information on the external device nor pause an adjustment of the scope turret to confirm accuracy of the graphical presentation. Additionally, in certain implementations, the graphical presentation can automatically update in real time (or near real time) in response to environmental changes detected at the external device or onboard scope sensors. Accordingly, the graphical presentation can include an accurate, pictorial (or alphanumeric) summary of the selected ballistic profile, distance compensation data, current environmental conditions, and/or settings data that a user can quickly identify and use.

Further, the disclosed scope turret can efficiently and flexibly update to accommodate different ballistic parameters, new ballistic profiles, etc. In particular, the disclosed scope turret can update a graphical presentation to present updated markings, updated distance compensation data, etc. that corresponds to the desired ballistic changes. In this manner, the updatable display of the disclosed scope turret avoids becoming obsolete due to invalid (or inaccurate) permanent markings.

These and other embodiments are discussed below with reference to FIGS. 1-15B. However, those skilled in the art will readily appreciate that the detailed description given herein with respect to the FIGS. is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a perspective view of an example of a scope 100. As shown, the scope 100 includes a variety of turrets. In particular, the scope 100 includes an elevation turret 102, a parallax turret 106, and a windage turret 108. Each of these turrets can tune or modify an optical assembly 110 disposed inside the scope 100 (e.g., to apply distance compensation). For example, the elevation turret 102, the parallax turret 106, and the windage turret 108 can twist or rotate about an axis of rotation to correspondingly tune the optical assembly 110. In particular embodiments, the elevation turret 102 rotates about an axis 112. Additionally, the parallax turret 106 and the windage turret 108 rotate about an axis 114.

In some embodiments, the twist or rotation of a turret adjusts the optical assembly 110 by a certain amount. For example, in some embodiments, a full revolution of a turret (e.g., the elevation turret 102) can equate to an adjustment of the optical assembly 110 from about twelve minutes of angle adjustment to about forty minutes of angle adjustment. In particular embodiments, a full revolution of a turret equates to about twenty minutes of angle adjustment. It will be appreciated that in other embodiments a full revolution equates to a different minute of angle adjustment (or a different increment of adjustment all together, such as milliradians).

As used herein, the terms "minute of angle" or "MOA" refer to an angular measurement. In particular, one minute of angle equates to 1/60th of a degree. A MOA adjustment on a turret can correlate to a particular change in location of projectile impact. For example, in relation to elevation, one MOA adjustment via the elevation turret 102 equates to about a one-inch elevation change (i.e., 1.047 inches) in impact at 100 yards, about a two-inch elevation change in impact at 200 yards, and so forth.

Similarly, as used herein, the terms "milliradians," "mils," or "MRADS" refer to an SI derived unit of angular measurement. In particular, one mil equates to a thousandth of a radian (i.e., 0.001 radian). A mil adjustment of a turret can likewise correlate to a particular change in location of projectile impact. For example, one milliradian equates to a one-meter elevation change in impact at 1000 meters.

Additionally shown in FIG. 1, the elevation turret 102 includes an electronic display 104. The electronic display 104 can include an e-ink interface. As another example, the electronic display 104 includes a light emitting diode (LED) display, quantum LED (QLED) display, organic LED (OLED) display, liquid crystal display, digital light processing display, plasma panel display, rear-projection display, a micro display, etc. In one or more embodiments, the electronic display 104 comprises a graphical user interface with compatibility to software application programming. As a graphical user interface, the electronic display 104 can provide users the capability to intuitively operate the elevation turret 102, communicate with an external device, etc. through manipulation of the electronic display 104 and/or elements coupled to the electronic display 104 (e.g., actuator (s) as will be described below).

In one or more embodiments, the electronic display 104 is compatible with myriad different environmental conditions. For example, the electronic display 104 can present graphical visualizations that are highly visible in broad daylight, low light, rain, snow, fog, etc. As another example, the electronic display 104 is resistant to and operable in such environmental conditions, including rain, snow, extreme temperatures (e.g., below freezing and above 100+ degree Fahrenheit), dust, debris, etc. In yet another example, the electronic display 104 is scratch and/or impact resistant to help mitigate undesired screen damage.

In certain embodiments, the electronic display 104 is power friendly. For example, the electronic display 104 can operate for extended periods of time (e.g., several days, a week, month, or longer) on a particular battery (or battery charge). This is especially useful for hunting and military applications where dependability over an extended period of time can be important.

As will be discussed below, the electronic display 104 can present a variety of different graphical visualizations. For example, the electronic display 104 can present ballistic profiles, distance compensation data, environmental conditions, turret settings, etc. Moreover, the electronic display 104 can present such information in a flexible manner (e.g., in response to real time changes in environmental conditions or ballistic parameter updates). In addition, the electronic display 104 can present graphical visualizations based on data received from an external device. Examples of an external device include a mobile device, range finder, binoculars, spotting scope, etc.

Indeed, the electronic display 104 can communicatively couple with one or more external devices to receive and store data for presentation. For instance, the electronic display 104 can connect with an external device via a wireless local area network communication, wireless area network communication, wireless personal area network communication, wide area network communication, etc. Some particular examples of wireless communication include a Wi-Fi based communication, mesh network communication, BlueTooth® communication, near-field communication, low-energy communication, Zigbee communication, Z-wave communication, and 6LoWPAN communication. Other forms of communication include wired connections, such as a USB connection, UART connection, USART connection, I2C connection, SPI connection, QSPI connection, etc.

Additional detail regarding the electronic display 104 will be discussed below. Furthermore, other features of the elevation turret 102 will be discussed below in relation to subsequent figures.

Any of the features, components, and/or parts, including the arrangements and configurations thereof shown in FIG. 1 can be included, either alone or in any combination, in any of the other examples of devices, features, components, and parts shown in the other figures described herein. For instance, the parallax turret 106 and/or the windage turret 108 can additionally (or alternatively) include the electronic display 104. To illustrate, in some embodiments, the windage turret 108 and the elevation turret 102 both include electronic displays (e.g., that are communicatively coupled). Likewise, any of the features, components, and/or parts, including the arrangements and configurations thereof shown and described with reference to the other figures can be included, either alone or in any combination, in the example of the devices, features, components, and parts shown in FIG. 1.

Figure 2:
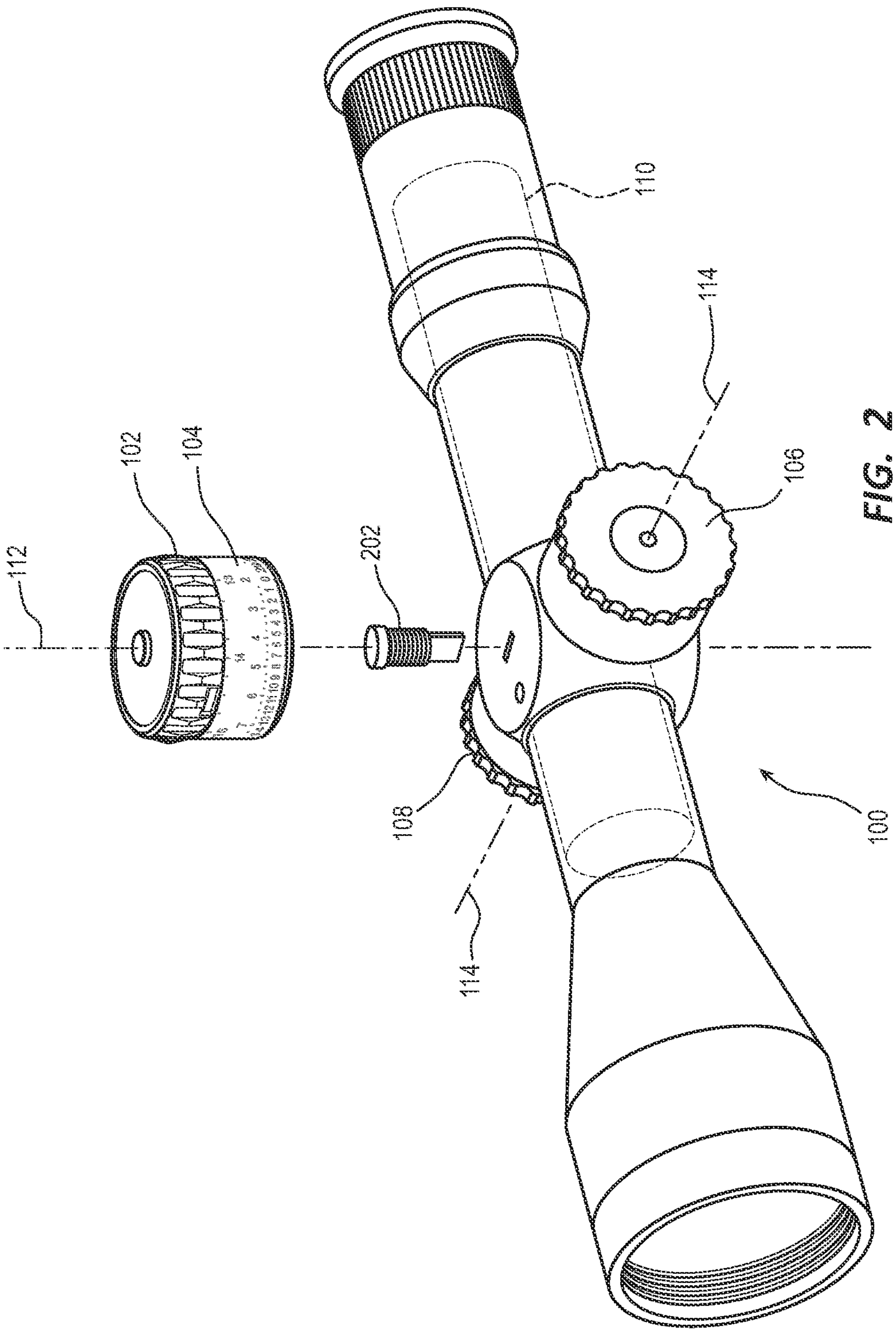
FIG. 2 illustrates an exploded view of an example scope.

As just described, the turrets of the scope 100 can tune or modify the optical assembly 110. The elevation turret 102 in particular can be rotated to apply bullet drop compensation by coupling the elevation turret 102 and the optical assembly 110 via an adjustment shaft. In accordance with one or more such embodiments, FIG. 2 illustrates an exploded view of an example of the scope 100 including an adjustment shaft 202 that couples the elevation turret 102 and the optical assembly 110.

In some embodiments, the elevation turret 102 is threadably coupled to the adjustment shaft 202. In turn, rotational movement of the elevation turret 102 engages the adjustment shaft 202. For example, rotational movement of the elevation turret 102 causes the adjustment shaft 202 to move vertically (e.g., parallel with the axis 112). Based on the vertical motion of the adjustment shaft 202, the adjustment shaft 202 impinges upon (or retracts away from) the optical assembly 110 to cause a corresponding adjustment upward or downward. Additional or alternative detail with respect to interactions between the elevation turret 102 and the optical assembly 110 is further described in U.S. patent application Ser. No. 14/820,080, filed on 6 Aug. 2015, entitled RIFLE SCOPE ELEVATION TURRET MECHANISM, the contents of which are expressly incorporated herein by reference in their entirety.

In some embodiments, the elevation turret 102 is decoupled from the adjustment shaft 202 (sometimes referred to as "slipping the turret"). For example, when sighting in the scope 100, the elevation turret 102 is decoupled from the adjustment shaft 202 such that the current positioning of the adjustment shaft 202 and the optical assembly 110 stays positionally fixed while the elevation turret 102 can be independently rotated to a zero position. The zero position on the elevation turret 102 refers to the rotational positioning of the elevation turret 102 indicative of zero adjustment to the optical assembly 110. Specifically, the zero position is a turret positioning where projectile impact aligns with the optical assembly 110 at a given zero distance (e.g., 100 yards, 200 yards, etc.). Once at the zero position, the elevation turret 102 can be recoupled to the adjustment shaft 202.

After sighting in the scope 100, the electronic display 104 can be powered on to present a graphical visualization (e.g., distance compensation data, ballistic profile, etc.). The graphical visualization can subsequently be utilized to quickly, efficiently, and accurately adjust the elevation turret 102. For example, the graphical visualization can be utilized to adjust the elevation turret 102 for shooting a firearm or cross-bow at a target distance other than the zero distance (e.g., at 380 yards instead of a zero distance of 200 yards).

Any of the features, components, and/or parts, including the arrangements and configurations thereof shown in FIG. 2 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 2.

Figure 3:
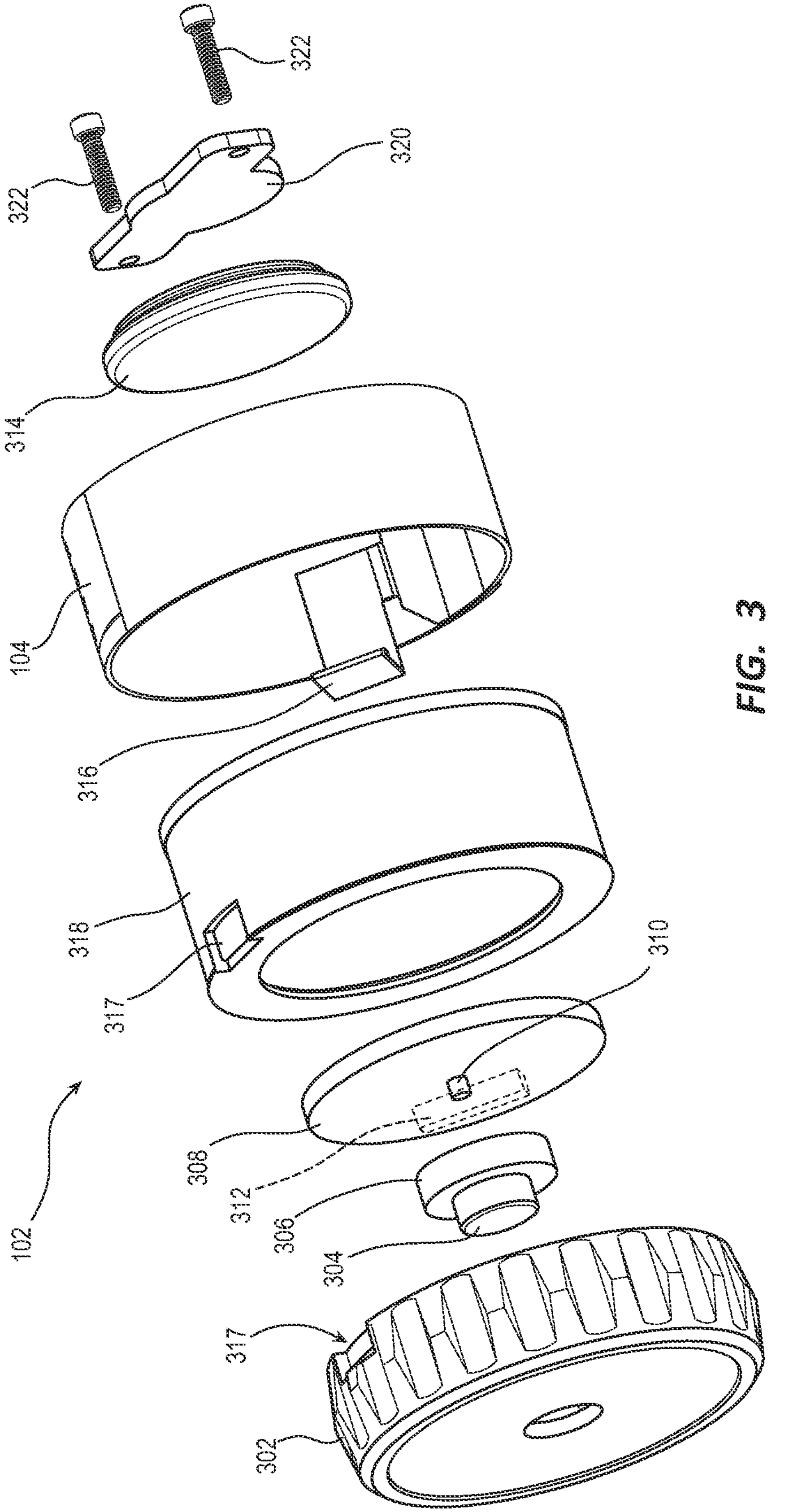
FIGS. 3-4 illustrate exploded views of an example elevation turret.
Figure 4:
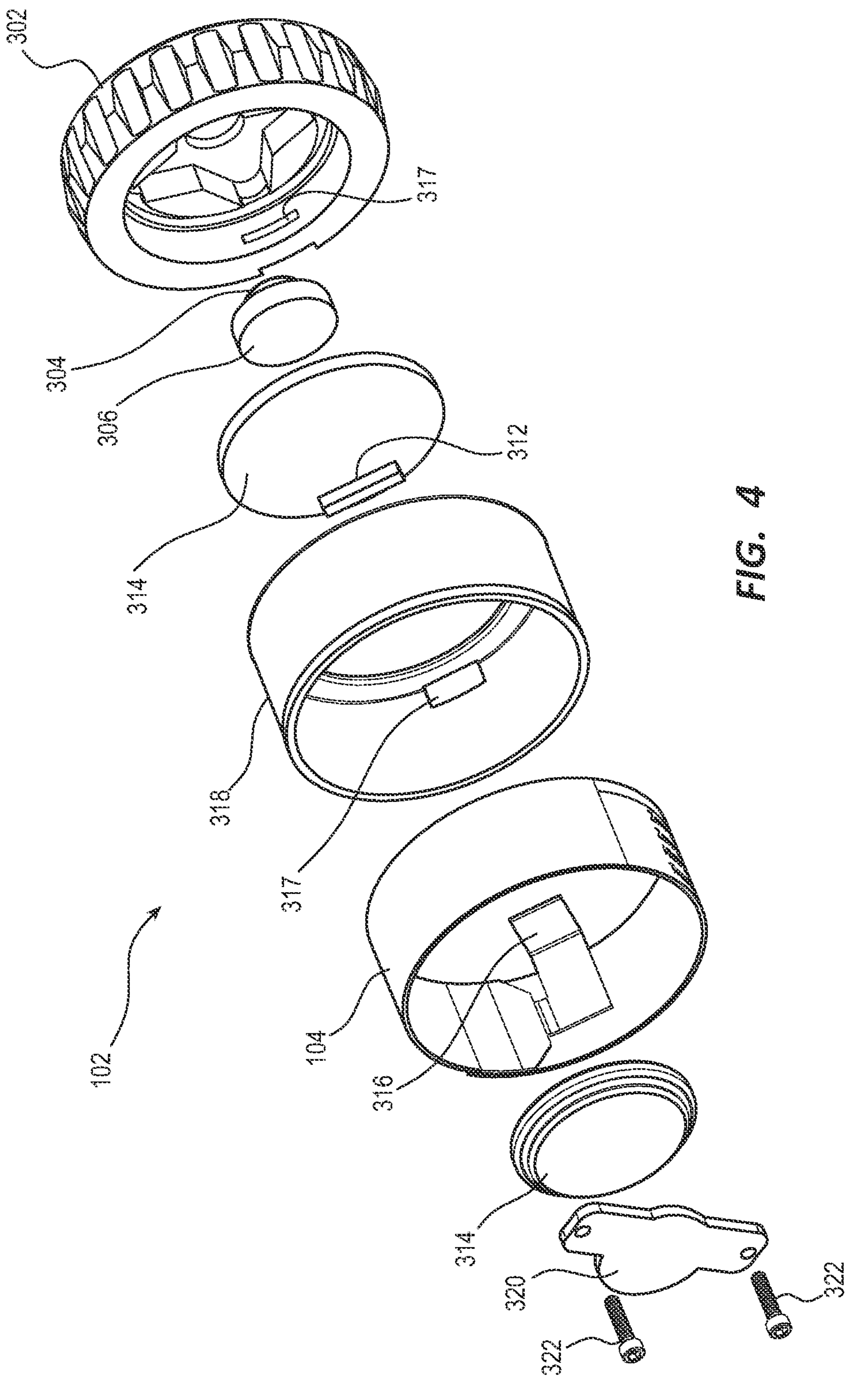

As mentioned above, the elevation turret 102 can include the electronic display 104. Additional features of the elevation turret 102 are now discussed. In accordance with one or more embodiments of the present disclosure, FIGS. 3-4 illustrate exploded views of an example of the elevation turret 102.

As shown, the elevation turret 102 includes a cap 302. The cap 302 corresponds to a top portion of the elevation turret 102. In some embodiments, the cap 302 can protect the internal components of the elevation turret 102. Additionally, in some embodiments, the cap 302 includes various tactile features to aid gripping the elevation turret 102 for rotation. In one or more embodiments, the cap 302 can also couple to the electronic display 104 via a connector aperture 317 defined by the cap 302 (as will be discussed more below in relation to subsequent figures).

In particular embodiments, the cap 302 defines one or more apertures in a top face of the cap 302 for integrating a particular type of actuator, such as a button. Specifically, a button 304 is configured to be inserted through an aperture of the cap 302. It will therefore be appreciated that the button 304 is sized and shaped to fit through the aperture in the cap 302. In some embodiments, the button 304 is a circle. In other embodiments, the button 304 is a triangle, square, rectangle, diamond, or other suitable shape (as the aperture may be defined). In one or more embodiments, the button 304 (or other actuator type) comprises a special shape for engaging a corresponding shape or trace on a printed circuit board (PCB) 308, donut type, dome type, tactile type, capacitance type, or inductance type of actuator. Further, in some embodiments, the button 304 is attached to the cap 302 (as opposed to a separate element).

In one or more embodiments, depressing the button 304 causes a button body 306—integrally attached to and supporting the button 304—to correspondingly engage a printed circuit board (PCB) 308. For example, depressing the button 304 causes the button body 306 to correspondingly depress a circuit button 310. The circuit button 310 when actuated can transmit an electrical signal via one or more connections (e.g., wiring, circuitry, etc.) along the PCB 308.

In some embodiments, the PCB 308 can include a flexible printed circuit. In other embodiments, the PCB 308 includes a rigid printed circuit board (e.g., to mount one or more sensors).

The PCB 308 can include one or more processors (e.g., a system on chip, integrated circuit, driver, microcontroller, application processor, crossover processor, etc.) mounted to the PCB 308. Further, the PCB 308 can also include one or more memory devices (e.g., individual nonvolatile memory, processor-embedded nonvolatile memory, random access memory, memory integrated circuits, DRAM chips, stacked memory modules, storage devices, memory partitions, etc.) mounted to the PCB 308. It will be appreciated that the one or more memory devices can store data from an external device (e.g., distance compensation data, ballistic profile, environmental conditions, turret settings, etc.).

Additionally or alternatively, the PCB 308 can include other suitable electronic components mounted to the PCB 308 (e.g., resistors, capacitors, inductors, potentiometers, transformers, diodes, transistors, etc.). Other example components mounted to the PCB 308 include certain wireless communication sensors (e.g., a BlueTooth® sensor). Still further, the PCB 308 can include a position sensor, global positioning system sensor, gyroscope sensor, accelerometer sensor, inclinometer sensor, magnetometer sensor, barometer sensor, etc. In particular embodiments, the PCB 308 includes a battery 314 mounted thereon that powers one or more components coupled to the PCB 308. In some embodiments, the PCB 308 includes a display mount 312 configured to receive a connector 316 of the electronic display 104. Further detail regarding the display mount 312 and the battery 314 are discussed below in relation to at least FIG.

Upon actuation of the circuit button 310, the PCB 308 can transmit an electrical signal to the one or more processors and/or other electrical components of the PCB 308. For example, in some embodiments, the PCB 308 can transmit an electrical signal to draw power from the battery 314 (e.g., to turn on the electronic display 104 or initiate a wireless connection process). As another example, in response to actuation of the circuit button 310, the PCB 308 can transmit an electrical signal to cause a certain arrangement of pixels presented at the electronic display 104. For instance, the PCB 308 can transmit an electrical signal through the display mount 312 and through the connector 316 to arrange black pixels and white pixels in the form of a graphical visualization. To illustrate, such an electrical signal can orchestrate the arrangement of black and white pixels in the form of numbers or hash marks representing adjustment metrics to the optical assembly in milliradians or minutes of angle (e.g., MOA hashes per target yardage increment).

In some embodiments, the one or more processors and/or the one or more memory devices of the PCB 308 include programming logic or display logic triggered by electrical signals (e.g., from actuation of the circuit button 310). For example, the display logic can accurately relate graphical visualizations to a percentage of the distance around the electronic display 104. That is, the display logic can use the circumference of the electronic display 104 as a calibration method to spatially arrange a graphical visualization in an accurate manner. As another example, the display logic can relate graphical visualizations to pixels or pixel distances as another calibration method. For instance, the display logic can orchestrate pixel color assignments circumferentially around the electronic display 104 to accurately correspond to MOA, MRAD, or yardage increments based on a number of pixels determined to interspace the increments in the X-direction around the electronic display 104 (or the Y-direction edge to edge of the electronic display 104).

Additionally or alternatively, the one or more processors and/or the one or more memory devices of the PCB 308 can include programming logic or display logic triggered by electrical signals from movement of the elevation turret 102. For example, in some embodiments, the electronic display 104 is a static display. However, in response to detected rotation (e.g., clicks) of the elevation turret 102, the PCB 308 can cause the electronic display 104 to provide an update graphical presentation (e.g., updated BDC values). In at least some embodiments, the PCB 308 causes the electronic display 104 to refresh after a threshold period of time has lapsed after rotation of the elevation turret 102. In other embodiments, the PCB 308 causes the electronic display 104 to refresh in real time (e.g., in response to each click) as the elevation turret 102 rotates.

Further, in some embodiments, the one or more processors and/or the one or more memory devices of the PCB 308 include programming logic or display logic triggered by electrical signals from other components outside of the elevation turret 102 (e.g., onboard sensors integrally attached to or embedded within the scope 100). For example, the PCB 308 can cause the electronic display 104 to automatically update in response to data from a position sensor, global positioning system sensor, gyroscope sensor, accelerometer sensor, inclinometer sensor, magnetometer sensor, barometer sensor, etc. onboard the scope 100. In some embodiments, the sensor updates and corresponding graphical visualization updates occur in batch intervals. In other embodiments, the PCB 308 provides continuous updates to the graphical visualization of the electronic display 104 based on real time (or near real-time) sensor updates.

Still further, in some embodiments, the or more processors and/or the one or more memory devices of the PCB 308 include programming logic or display logic triggered by electrical signals based on movement of other turrets. For example, the PCB 308 can cause the electronic display 104 to update a graphical visualization in response to rotation of the windage turret or the parallax turret. In this manner, the PCB 308 can receive other turret rotation signals and cause the electronic display 104 to present a corresponding solution (e.g., updated BDC values) that account for the other turret's rotation. The PCB 308 can also provide outgoing signals to other printed circuit boards and/or electronic displays of other turrets (e.g., the windage turret) for correspondingly updating a different electronic turret display based on movement of the elevation turret 102.

In one or more embodiments, the one or more processors and/or the one or more memory devices of the PCB 308 receive updated data from an external device (e.g., updated environmental conditions, a different ballistic profile, etc.). In certain embodiments, the one or more processors and/or the one or more memory devices of the PCB 308 receive updated data on a rolling basis (e.g., in real time or near real time). In other embodiments, the one or more processors and/or the one or more memory devices of the PCB 308 receive updated data on a batch basis a predetermined time intervals (e.g., every fifteen seconds, thirty seconds, sixty seconds, five minutes, ten minutes, twenty minutes, etc.)

The electronic display 104 can correspondingly update or present a graphical visualization in response to the one or more processors and/or the one or more memory devices of the PCB 308 receiving data from an external device. In some embodiments, the electronic display 104 is synchronized with the data push from the external device to the one or more processors and/or the one or more memory devices of the PCB 308 such that the electronic display 104 presents a graphical visualization with little or no latency. In particular embodiments, the electronic display 104 presents a corresponding graphical visualization with a latency of about 1 millisecond to about 1 second. In certain implementations, the electronic display 104 presents a corresponding graphical visualization with a latency of about 50 milliseconds to about 500 milliseconds. Still further, in some embodiments, the electronic display 104 presents a corresponding graphical visualization with a latency of about 100 milliseconds to about 200 milliseconds.

Additionally shown in FIGS. 3-4, the elevation turret 102 includes a turret body 318. The turret body 318 houses the internal components of the elevation turret 102. In addition, the turret body 318 includes a mounting surface for the electronic display 104. Specifically, the outer face of the turret body 318 is configured to mate, join, or otherwise abut with the interior face of the electronic display 104. Accordingly, an outer diameter of at least a portion of the turret body 318 is less than or equal to the inner diameter of the electronic display 104 such that the electronic display 104 can slip over and couple to the turret body 318. Indeed, the turret body 318 and the electronic display 104 are rotatably coupled together. For instance, in certain embodiments, the electronic display 104 is press-fit and/or adhered onto the turret body 318 (e.g., using an adhesive, epoxy, etc.). In other embodiments, the electronic display 104 is fastened onto the turret body 318 utilizing one or more suitable fasteners. Additionally or alternatively, the electronic display 104 is connected to the turret body 318 via engagement of the connector 316 and a corresponding connector aperture 317 in the turret body 318 as will be described below.

Further, in one or more embodiments, the turret body 318 is configured to attach to the cap 302. In some embodiments, the cap 302 is press-fit or adhered onto the turret body 318. In other embodiments, the cap 302 is removably attached to the turret body 318. For example, although not shown, the turret body 318 and the cap 302 can included mating threads to form a threaded engagement between each other. As another example, the turret body 318 and the cap 302 are fastened together via one or more fasteners.

The elevation turret 102 also includes a battery holder 320 and fasteners 322. The battery holder 320 and the fasteners 322 are configured to couple the battery 314 and the PCB 308. For example, the battery holder 320 and the fasteners 322 seat the battery 314 against a surface of the PCB 308.

Modifications, additions, and omissions to the foregoing components are herein contemplated. As an example, the elevation turret 102 can include a buttonless embodiment. For example, the electronic display 104 can be powered on by an external device (e.g., via BlueTooth). As another example, the electronic display 104 can be powered on by interacting directly with the electronic display 104 (e.g., via taps, swipes, etc.). In like manner, a user can navigate, select, or otherwise interact with the electronic display 104 without a button. For instance, an external device can drive (e.g., reprogram or select a new ballistic profile for presentation at) the electronic display 104 without the need for a button.

Further, one of ordinary skill in the art will appreciate that the button 304 is but one example of an actuator. Indeed, as used herein, the term "actuator" refers to one or more components that can actuate component movement, electric (or digital) signals, fluid, sound, etc. to drive a response at the electronic display 104, an external device, or other component(s) disclosed herein. For example, an actuator can include, for instance, linear actuators, rotary actuators, hydraulic actuators, pneumatic actuators, electric actuators, digital actuators, thermal actuators, magnetic actuators, mechanical actuators, supercoiled polymer actuators, etc.

As another example alternative, the elevation turret 102 can include multiple buttons (e.g., as described below in relation to FIG. 8). Additionally or alternatively, the elevation turret 102 can include inputs besides a button input. Indeed, the elevation turret 102 can include a joystick, special shape PCB trace (e.g., a donut shape PCB trace), or a combination of the foregoing.

In yet another example alternative, the electronic display 104 of the present disclosure can be integrated with a conventional scope turret. For example, the electronic display 104 can be adhered or fastened to a conventional scope turret (e.g., for rotating with the turret). To illustrate, the electronic display 104 can be glued onto a conventional scope turret, thereby providing a cover around the circumference of a conventional scope turret. In this example, the electronic display 104 can include a display system composed of one or more processors, memory devices, and/or other of the foregoing components to communicatively couple with an external device and present a graphical visualization as disclosed herein.

Any of the features, components, and/or parts, including the arrangements and configurations thereof shown in FIGS. 3-4 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 3-4.

Figure 5B:
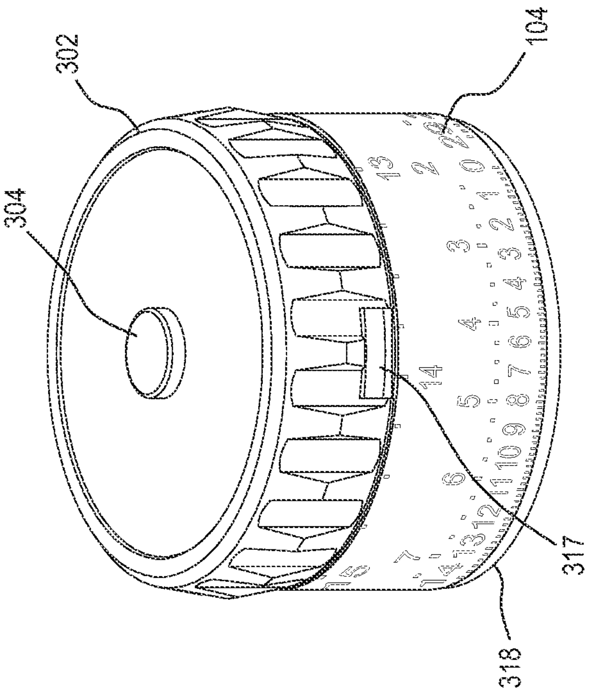
FIGS. 5A-5B illustrate perspective views of an example assembled elevation turret.
Figure 5A:
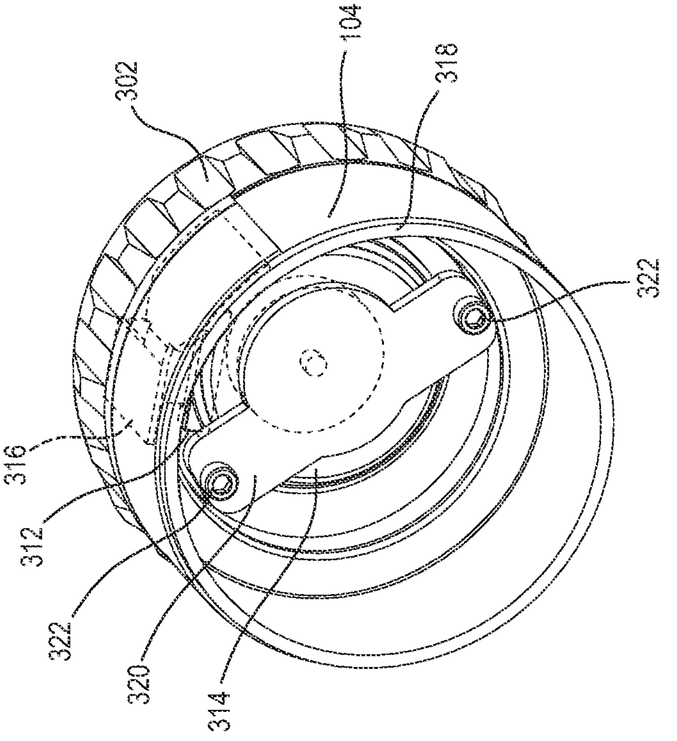

FIGS. 5A-5B illustrate perspective views of an example assembled elevation turret in accordance with one or more embodiments of the present disclosure. Additional detail regarding one or more components of the elevation turret 102 are now provided.

In particular, FIGS. 5A-5B depict a connector assembly that includes the connector 316 and the display mount 312. As shown, the connector 316 includes a connection prong that integrally connects to a tip end of the electronic display 104 closest to the connector aperture 317 of the cap 302 and the turret body 318. The connector 316 then runs through the connector aperture 317 to connect to the display mount 312.

Further shown, the connector 316 wraps around the turret body 318 and underneath a portion of the electronic display 104. In at least some embodiments, this configuration allows a full, unblocked view of the electronic display 104 without a portion being covered by the connector 316. In other embodiments, the connector 316 need not be positioned underneath the electronic display 104.

Figure 15A:
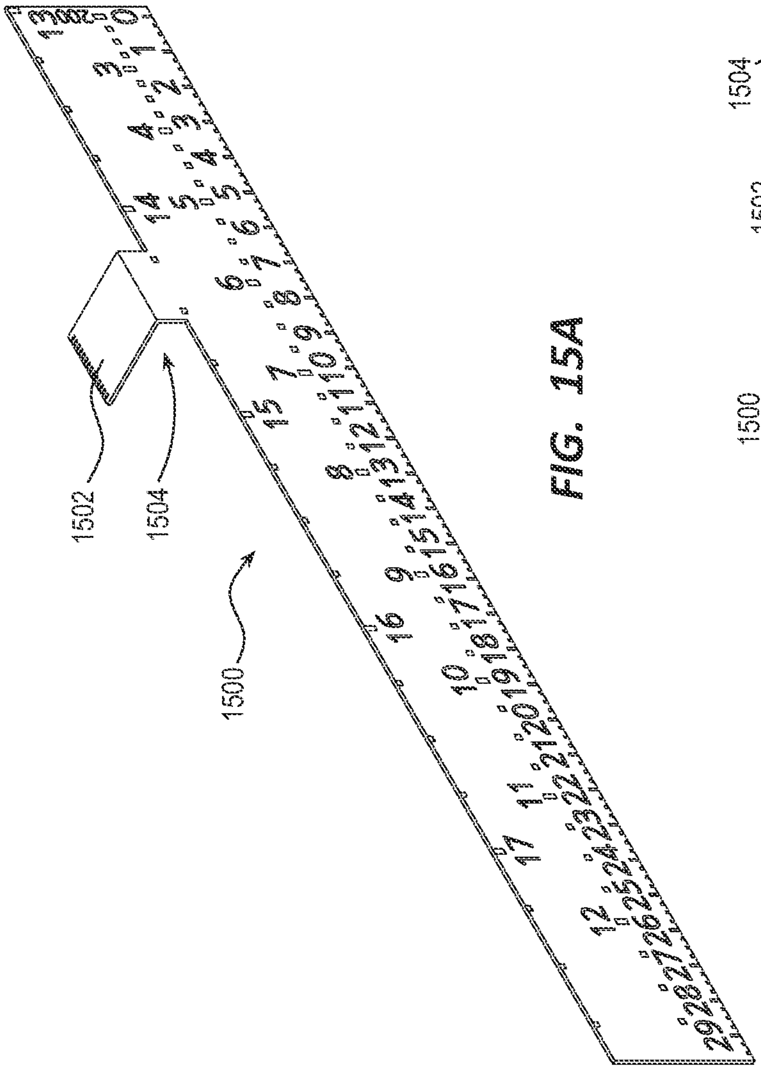
FIGS. 15A-15B illustrate yet another example electronic display.
Figure 15B:
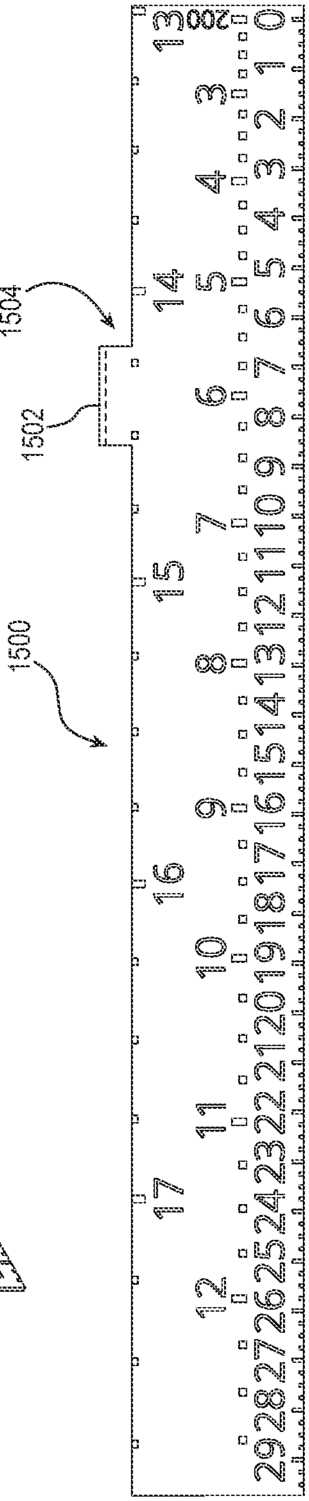

In some embodiments, the connector 316 is a rigid connection piece that maintains a substantially consistent shape, curvature, form factor, etc. In other embodiments, the connector 316 is a flexible connection piece (e.g., that can bend, deform, or adjust as may be desired). It will be appreciated that myriad different embodiments of the connector 316 fall within the scope of the present disclosure. For instance, the connector 316 need not extend from a tip end of the electronic display 104. Rather, the connector 316 can extend from a top or bottom edge of the electronic display 104 (e.g., as shown in FIGS. 15A-15B).

In some embodiments, the connector assembly can couple the electronic display 104 and the PCB 308. For example, via the connector assembly, the elevation turret 102 can present graphical visualizations at the electronic display 104 by relaying an electrical signal from the PCB 308, to the display mount 312, through the connector 316, and to the electronic display 104. In one or more embodiments, the display mount 312 transforms electrical signals from the PCB 308 (e.g., for transmission to the electronic display 104). In some embodiments, the display mount 312 generates additional or alternative electrical signal(s) to transmit to the electronic display 104 based on an electrical signal (or sequence/combination of electrical signals) from the PCB 308. It will be appreciated that such electrical signals can correspond to one or more display instructions (e.g., to cause a particular arrangement of assigned pixel colors, refreshing of pixels, etc.). In certain implementations, an electrical signal can cause the electronic display 104 to power down (e.g., due to inactivity or a threshold period of time lapsing). In one or more embodiments, an electrical signal can include instructions to maintain a pixel color assignment even after the electronic display 104 is powered off (e.g., for e-ink displays). In particular embodiments, these and other electrical signals disclosed herein correspond to non-transitory signals.

In some embodiments, the display mount 312 and the connector 316 relay electrical signals from the electronic display 104 to the PCB 308. For example, in certain implementations, the electronic display 104 can sense haptic inputs (e.g., to select a ballistic profile) at the electronic display 104 via embedded (or layered) sensors and/or circuitry. To illustrate, in one or more embodiments, the electronic display 104 includes an accelerometer sensor to detect taps, swipes, pinches, etc. at the electronic display 104. As another example, the electronic display 104 includes capacitive and/or resistive circuitry to detect haptic inputs. As other examples, the electronic display 104 includes one or more of a near-infrared light sensor, sound wave sensor, camera sensor, etc. to detect haptic inputs. In response to haptic input, the sensor(s) and/or circuitry can transmit an electrical signal through the connector 316, through the display mount 312, and to the PCB 308. Alternatively, the sensor(s) and/or circuitry can transmit an electrical signal regarding haptic input directly to the PCB 308, bypassing the connector 316 and the display mount 312.

In some embodiments, the connector assembly can provide a rotational coupling between components. For example, the connector 316 extending from the electronic display 104 is inserted into the connector aperture 317 disposed within the cap 302 and the turret body 318 to provide a rotational link between each of the electronic display 104, the cap 302, and the turret body 318. That is, each of the electronic display 104, the cap 302, and the turret body 318 can rotate as a single unit with the connector 316 inserted into the display mount 312. In certain implementations, the connector 316 is composed of a material or coating to impart a sufficient stiffness for bearing a force load from rotating the electronic display 104, the cap 302, and the turret body 318 together. In other implementations, the connector 316 is non-load bearing. For instance, the electronic display 104 is fastened or otherwise secured to at least one of the cap 302 or the turret body 318 such that the electronic display 104, the cap 302, and the turret body 318 can rotate together as a single unit regardless of the connector 316.

FIG. 5A further shows the battery 314 and the battery holder 320. The battery 314 can include myriad different types of batteries or power sources. Indeed, the battery 314 can include one or more electrochemical cells with external connections for powering electrical devices. For example, in some embodiments, the battery 314 includes a lithium ion battery, alkaline battery, carbon zinc battery, zinc air battery, lead-acid battery, nickel-cadmium battery, nickel-metal hydride battery, etc. In a specific example, the battery 314 includes a 2032 coin cell battery. It will therefore be appreciated that the battery 314 can be dispensable or rechargeable, as may be desired.

In some embodiments, the battery holder 320 is sized and shaped according to the type, size, and/or shape of the battery 314. Additionally or alternatively, the battery holder 320 is sized and shaped to provide a certain force distribution against the battery 314. Further, in some embodiments, the battery holder 320 includes one or more materials or coatings for operating the battery 314. For instance, the battery holder 320 includes one or more of a conductive surface to interface with the battery 314. As another example, the battery holder 320 includes an insulative surface (e.g., for thermal and/or electrical insulation). Further, albeit not illustrated, in one or more embodiments, the battery holder 320 can include on or more features for engaging an adjustment shaft (e.g., the adjustment shaft 202 shown in FIG. 2).

Additionally shown in FIG. 5B, the elevation turret 102 includes the button 304. Actuation of the button 304 can correspond to a variety of different button logic. For example, in one or more embodiments, depressing the button 304 can cause the electronic display 104 to interactively present graphical visualizations that update in response to input at the button 304. To illustrate, depressing the button 304 can cause one or more processors and/or memory devices of the PCB 308 to transmit data for display at the electronic display 104 that corresponds to ballistic profile options, turret settings, environmental conditions, etc. In certain implementations, depressing the button 304 can navigate menu options (e.g., dropdown menus), folders, tabs, display windows, etc. In particular embodiments, depressing the button 304 once can correspond to various actions or navigations (e.g., enter, select, next, tab over, level down, etc.). Similarly, depressing the button 304 two or more times within rapid succession (e.g., within about a 1-2 second time window or less) can correspond to other actions or navigations, such as cancel, back, repeat, previous tab, level up, etc. It will be appreciated that myriad other button logic is within the scope of the present disclosure. Additional or alternative button logic can also be employed for multiple buttons (e.g., as shown in FIG. 8).

Any of the features, components, and/or parts, including the arrangements and configurations thereof shown in FIGS. 5A-5B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 5A-5B.

Figure 6B:
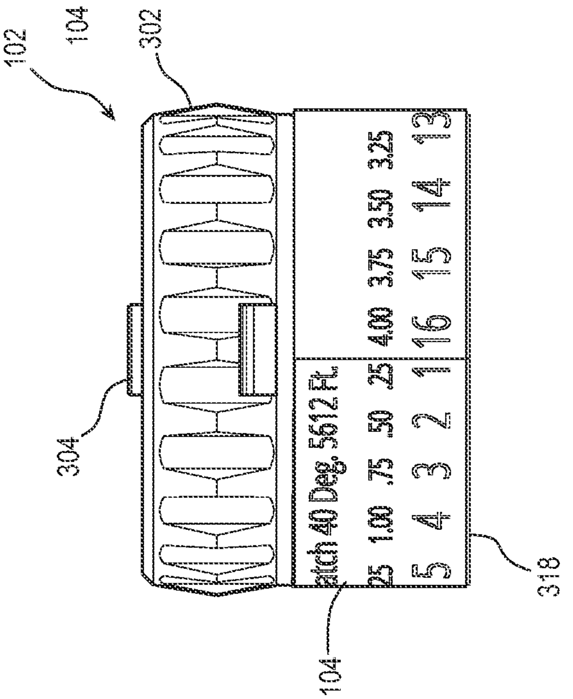
FIGS. 6A-6B illustrate side views of an example elevation turret.
Figure 6A:
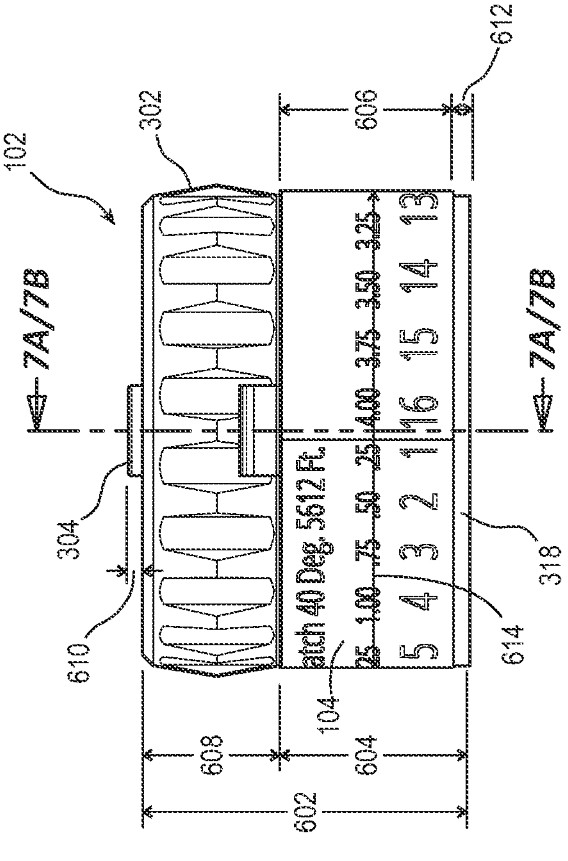

As discussed above, various components of the elevation turret 102 can include a variety of different shapes, sizes, dimensions, and/or configurations. In accordance with one or more such embodiments of the present disclosure, FIGS. 6A-6B illustrate side views of examples of the elevation turret 102. In particular, FIG. 6A depicts various dimensions of the elevation turret 102. As shown, the elevation turret 102 includes a height 602. The height 602 can be broken down into component heights. For example, the height 602 is composed of a cap height 608, a display height 606, and an exposed body height 612. Likewise, the height 602 is composed of the cap height 608 and a height 604 (measured from the base of the turret body 318 to the top edge of the electronic display 104). The height 602 can also include different height compositions, such as the cap height 608 and the display height 606 where the bottom edge of the electronic display 104 extends down and is flush with the bottom of the turret body 318.

In addition, the elevation turret 102 includes a diameter 614 (measured as the outer diameter of the electronic display 104). Various portions of the elevation turret 102 can be slightly larger or smaller than the diameter 614. For example, portions of the cap 302 can extend beyond the diameter 614. Further, the outer diameter of the turret body 318 is less than the diameter 614, such that the electronic display 104 can fit over the turret body 318.

The button 304 includes a button height 610. The button height 610 can be sized to provide convenient operation of the elevation turret 102. Additionally or alternatively, the button height 610 can be sized to reduce undesired button inputs (e.g., from snagging on clothing, trees, brush, etc.).

It will be appreciated that the values of the foregoing dimensions of the elevation turret 102 can include a wide range of dimensions for application on a scope for a gun or crossbow. For example, the height 602 can include a height of about 0.25 inches to about 4 inches. As another example, the height 602 can include a height of about 0.5 inches to about 2 inches. In particular embodiments, the height 602 is about 1.25 inches.

Similarly, the diameter 614 can include a diameter of about 0.25 inches to about 4 inches. As another example, the diameter 614 can include a diameter of about 0.5 inches to about 2 inches. In particular embodiments, the diameter 614 is about 1.25 inches.

Other dimensions of the elevation turret 102 can be scaled in proportion to at least one of the height 602 or the diameter 614. Additionally, it will be appreciated that the dimensions and proportions of the elevation turret 102 can be modified within the scope of the present disclosure.

For example, as shown for the elevation turret 102 in FIG. 6B, the electronic display 104 is enlarged relative to the turret body 318. Specifically, in FIG. 6B, the display height 606 is increased and the exposed body height 612 is correspondingly decreased. The display height 606 can be increased to provide a larger viewing area of the electronic display 104. In turn, the larger viewing area of the electronic display 104 can facilitate presentation of more data, larger font size, or additional graphics. Accordingly, certain implementations of the elevation turret 102 do not include hash marks or other markings in a region defined by the exposed body height 612 of the turret body 318 (unlike FIG. 8). Indeed, this region can be left unmarked if the exposed body height 612 of the turret body 318 is below a threshold size or the turret body 318 is entirely covered.

In contrast, alternative embodiments can include a smaller viewing area of the electronic display 104 (e.g., a smaller display height 606 and a larger exposed body height 612) to reduce power consumption of the electronic display 104. Additionally or alternatively, the smaller viewing area of the electronic display 104 can allow room in the region defined by the exposed body height 612 of the turret body 318 for providing one or more permanent marks (e.g., a witness mark) aligning with a portion of the electronic display 104 and/or the scope body adjacent to the elevation turret 102.

Further shown in FIGS. 6A-6B, the cap 302 can include various tactile features around the outer sidewall of the cap 302. The tactile features can include myriad different configurations or arrangements. In some embodiments, the tactile features can be design oriented (e.g., for aesthetics only). In other embodiments, the tactile features can be functional (e.g., to aid gripping and twisting of the elevation turret 102). In one or more embodiments, the tactile features of the cap 302 include ribs, slots, dimples, sloped faces, protrusions, indentations, convex/concave surfaces, pointed tips, etc.

Additionally, in one or more embodiments, the cap 302 comprises various material(s) to aid gripping or twisting the cap 302. For instance, the cap 302 includes a tacky material, high friction material, deformable material, rigid material, etc. Additionally or alternatively, the cap 302 includes a material coating or sleeve to at least partially cover the cap 302. In some embodiments, the cap 302 includes multiple materials. For example, the cap 302 includes a first material for a top face (e.g., metal or plastic) and a second material for the sidewall (e.g., silicone or rubber).

Any of the features, components, and/or parts, including the arrangements and configurations thereof shown in FIGS. 6A-6B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 6A-6B.

As mentioned above, the elevation turret 102 can include a variety of components. In accordance with one or more such embodiments, FIGS. 7A-7B respectively illustrate a bottom perspective cross-sectional view and a side cross-sectional view of the elevation turret 102. As shown, the elevation turret 102 includes a particular sequencing or stacked arrangement of components. Specifically, from bottom to top, inside the elevation turret 102 includes the fasteners 322, the battery holder 320, the battery 314, the connector assembly (i.e., the connector 316 and the display mount 312), the PCB 308, and the button body 306. Other arrangements are also herein contemplated. Indeed, the foregoing arrangement of components can be modified as may be desired (e.g., for spatial constraints, power constraints, operability, etc.).

It will also be appreciated that the elevation turret 102 can include a variety of different materials. In some embodiments, the elevation turret 102 includes components comprising a flexible material (e.g., plastic, silicone, etc.). Additionally or alternatively, the elevation turret 102 includes components comprising a rigid material (e.g., metal, composites, epoxies, etc.). In some embodiments, one or more components of the elevation turret 102 include multiple different materials (e.g., alloys, fiber layers, etc.).

Similarly, the various components of the elevation turret 102 can include myriad different gauges or thicknesses of materials. In some embodiments, a thickness of material is tuned for durability, robustness (e.g., in rugged, outdoor environments), or resistance to weather elements (e.g., extreme temperatures, rain, snow). Additionally or alternatively, the thickness of material is tuned for material consumption, weight savings, manufacturability, etc.

In these or other embodiments, the various components of the elevation turret 102 can be manufactured in myriad different ways. In some embodiments, one or more components of the elevation turret 102 are forged, cast, molded, drawn, extruded, shaped, cut, punched, sheared, stamped, etc. Additionally or alternatively, one or more components of the elevation turret 102 are machined (e.g., milled, turned, drilled, polished, deburred, threaded, bored, planed, broached, sawed, etc.). In some embodiments, one or more components of the elevation turret 102 are manufactured via 3D-printing, rotational molding, vacuum forming, injection molding, extrusion, blow molding, etc.

In certain implementations, one or more components of the elevation turret 102 are treated (e.g., heat treated, annealed, cold rolled, dip coated, spray coated, etc.). Similarly, certain components of the elevation turret 102 (e.g., the turret body 318) can be marked (e.g., via laser etching, high pressure water etching, chemical etching, electrochemical etching, electric arc etching, etc.).

A combination of the foregoing methods are also herein contemplated. Further, it will be appreciated that alternative manufacturing methods can fall within the scope of the present disclosure.

Additionally, the components of the elevation turret 102 can be joined together and positioned within the elevation turret 102 in a variety of different ways. In some embodiments, the components of the elevation turret 102 are joined together via fasteners. For example, the fasteners 322 joins the battery 314 and the PCB 308. Additionally or alternatively, the components of the elevation turret 102 are joined together via adhesion. For example, in some embodiments, the display mount 312 is bonded to the PCB 308. As another example, the PCB 308 is adhered to at least one of the cap 302 or the button body 306 to maintain the PCB 308 in position. For instance, the PCB 308 includes pressure sensitive adhesive bonding the PCB 308 to an interior surface of the cap 302, thereby maintaining the PCB 308 inside the cap 302.

Figure 7B:
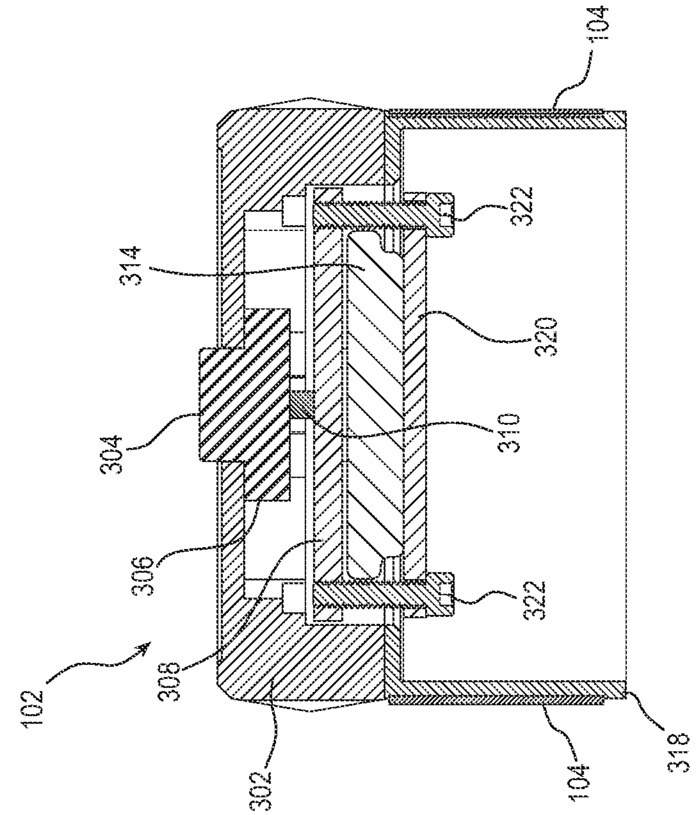
FIGS. 7A-7B respectively illustrate a bottom perspective cross-sectional view and a side cross-sectional view of an example elevation turret.
Figure 7A:
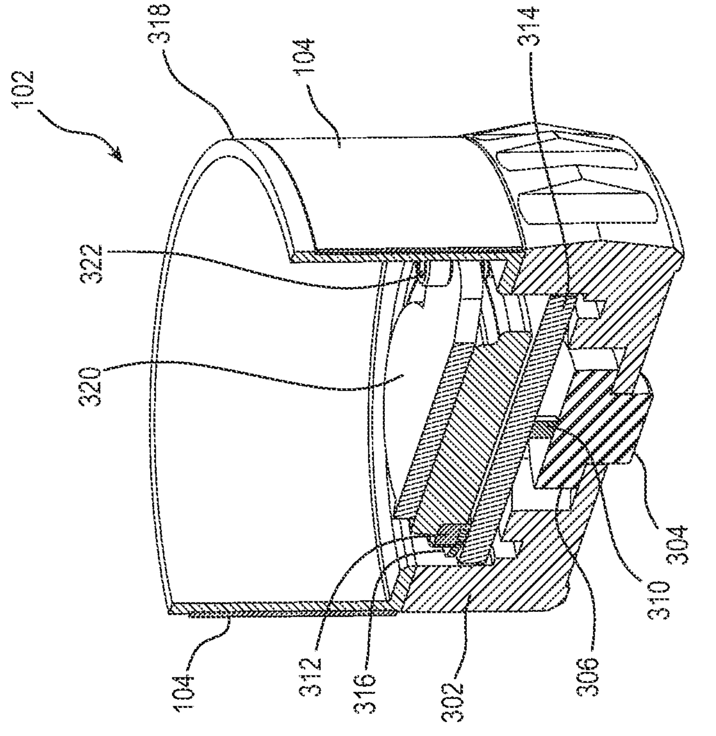

Any of the features, components, and/or parts, including the arrangements and configurations thereof shown in FIGS. 7A-7B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 7A-7B.

As mentioned above, in one or more embodiments, the elevation turret 102 can include multiple buttons. In accordance with one or more such embodiments, FIG. 8 illustrates an example of the elevation turret 102 including multiple buttons on or within the cap 302. In particular, FIG. 8 illustrates the elevation turret 102 including the button 304 in addition to buttons 804.

The buttons 804 can be sized and shaped in myriad different ways. As depicted in FIG. 8, the buttons 804 resemble triangles for directional arrows (e.g., up, down, left, and right). In some embodiments, the buttons 804 can be implemented for a variety of different button logic. That is, each of the buttons 804 can correspond to a circuit button on the PCB 308 to drive an associated electrical signal. To illustrate, the buttons 804 can be used to more intuitively navigate through menu options, tabs, folders, etc. presented at the electronic display 104, among other possible graphical visualizations.

It will be appreciated that the buttons 804 need not include navigation buttons. Indeed, one or more of the buttons 804 can include special function buttons (e.g., a wireless connection button, a power button, a reset button, a save button, a display lock button, a new data entry button, a new ballistic profile button, etc.).

Figure 8:
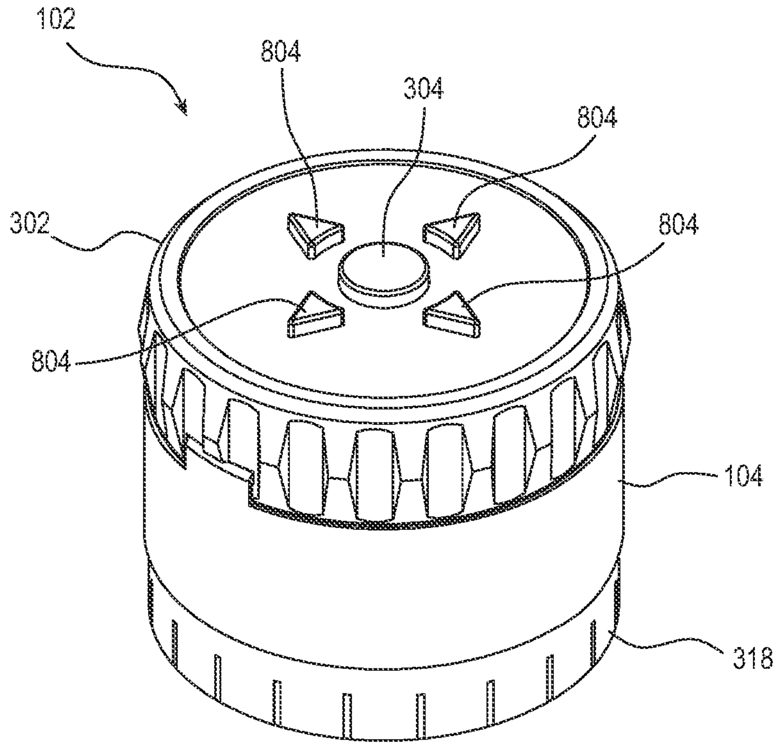
FIG. 8 illustrates an example elevation turret including multiple buttons.

Any of the features, components, and/or parts, including the arrangements and configurations thereof shown in FIG. 8 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 8.

Figure 9A:
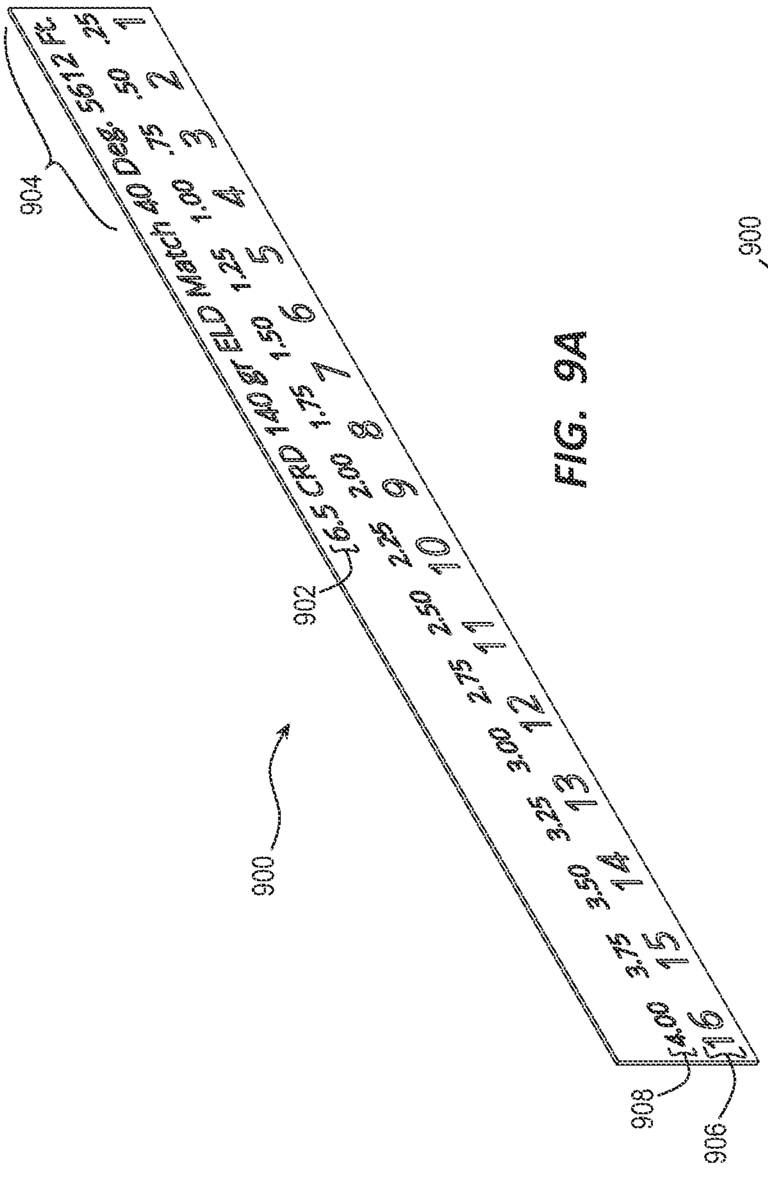
FIGS. 9A-9B illustrate an example electronic display.
Figure 9B:
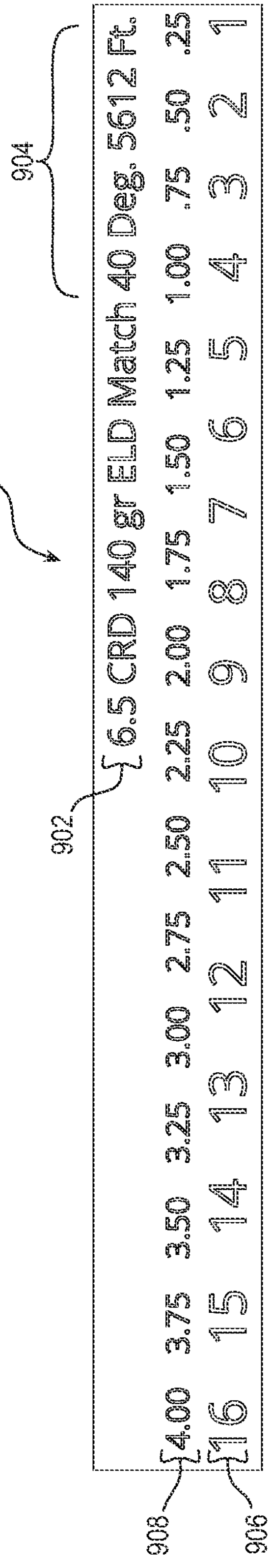

As discussed above, the elevation turret 102 can present graphical visualizations that include one or more of a ballistic profile, distance compensation data, environmental conditions, turret settings, etc. In accordance with one or more such embodiments, FIGS. 9A-9B illustrate an example of the electronic display 104 discussed above. In particular, FIGS. 9A-9B illustrate an electronic display 900 with a particular graphical visualization. As used herein, the term "graphical visualization" refers to a visual presentation of alphanumeric characters, icons, symbols, emojis, glyphs, words, acronyms, shorthand notation, pictures, graphs, tables, markings, etc.

In FIGS. 9A-9B, the graphical visualization of the electronic display 900 includes a ballistic profile 902. As used herein, the term "ballistic profile" refers to characteristics, attributes, or values for a certain gun and/or ammunition to be fired by the gun. Alternatively, a ballistic profile can include characteristics, attributes, or values for a specific combination of cross-bow, effective draw weight, arrow, and/or broadhead. In particular, a ballistic profile can quantify or represent the behavior (e.g., trajectory, speed, energy, etc.) of a projectile or bullet as a function of certain parameters. As an example, a ballistic profile can include a ballistic coefficient, muzzle velocity, spin drift, twist parameter, flight time per distance, bullet drop per distance, energy per distance, etc. for a given type of ammunition. To illustrate, the ballistic profile 902 in FIGS. 9A-9B indicates that the presented data in the electronic display 900 accounts for one or more of the foregoing parameters for a 6.5 mm Creedmoor 140 grain ELD® Match cartridge/bullet combination.

Additionally shown in FIGS. 9A-9B, the graphical visualization of the electronic display 900 includes environmental conditions 904. As used herein, the term "environmental conditions" refers to the characteristics of the ambient environment. In particular embodiments, environmental conditions includes pressure, temperature, humidity level, coordinate location in longitude and/or latitude, compass heading, elevation, wind speed, wind direction, inclination or angle to target, distance to target, Coriolis, etc. As a particular example, the environmental conditions 904 depicted in FIGS. 9A-9B include a 40 degree latitude positioning (in northern or southern hemisphere) and a shooting elevation of 5,612 feet. In some embodiments, environmental conditions includes a delta value (e.g., a quantitative change or metric) compared to a previous environmental condition.

Further, the graphical visualization of the electronic display 900 in FIGS. 9A-9B include distance compensation data. As used herein, the term "distance compensation data" refers to an amount of adjustment to the optical assembly. In particular embodiments, distance compensation data can include bullet drop compensation ("BDC") in minutes of angle, milliradians, inches, etc. In some embodiments, distance compensation data can include adjustment metrics (e.g., numbers) or markings (e.g., hash marks) for adjusting to a certain distance to target or a certain amount of BDC. To illustrate, the distance compensation data in the graphical visualization of the electronic display 900 includes turret click indicators 906 and BDC 908. The turret click indicators 906 are indexed rotational points that correspond to a given BDC. For instance, one turret click (indicated by the value "1" in the turret click indicators 906) corresponds to one quarter MOA (indicated by the value "0.25" in the BDC 908). Similarly, two turret clicks (indicated by the value "2" in the turret click indicators 906) corresponds to one half MOA (indicated by the value "0.5" in the BDC 908), and so forth.

Figure 10A:
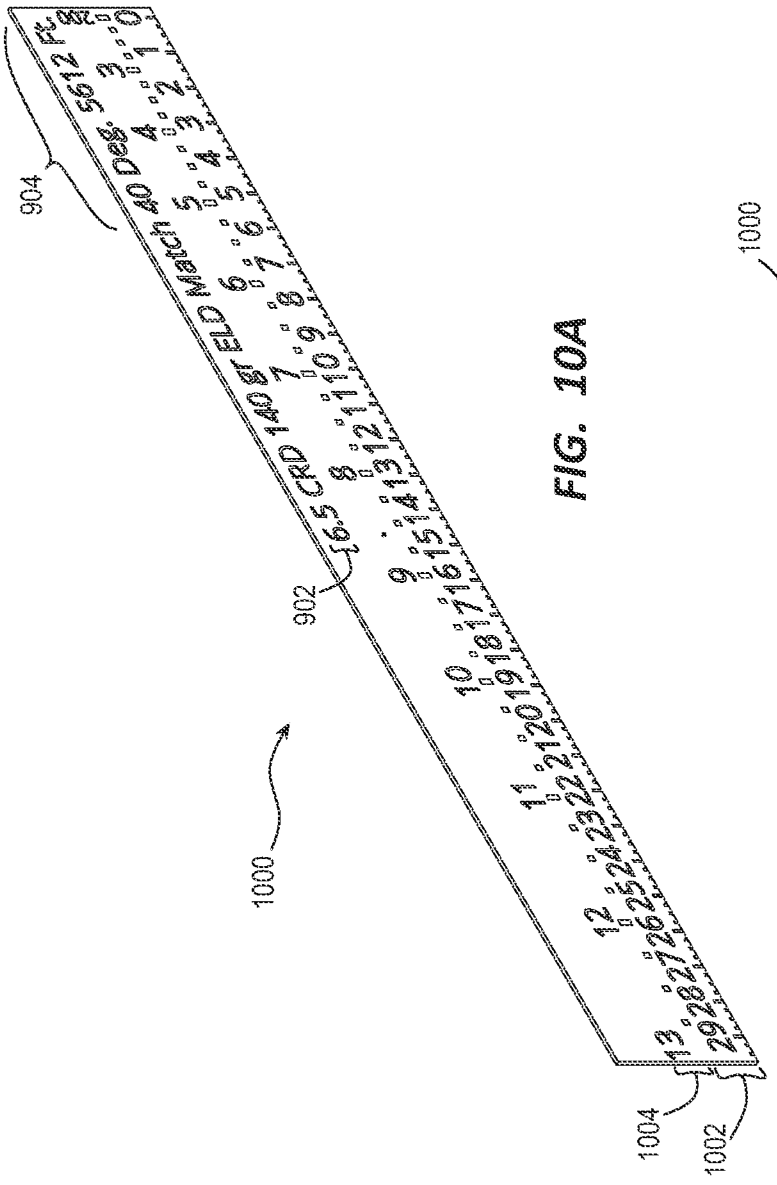
FIGS. 10A-10B illustrate another example electronic display.
Figure 10B:
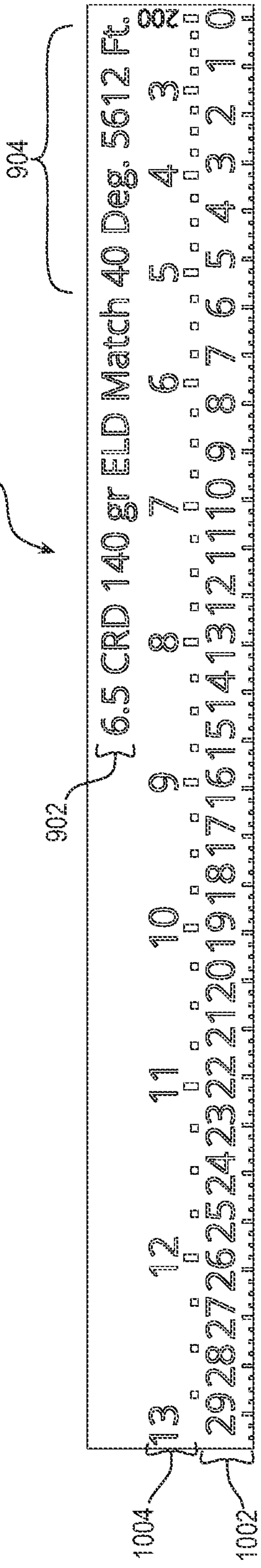

As just discussed, the elevation turret 102 can present graphical visualizations that include one or more of a ballistic profile, distance compensation data, environmental conditions, turret settings, etc. In accordance with one or more such embodiments, FIGS. 10A-10B illustrate another example of the electronic display 104 discussed above. In particular, FIGS. 10A-10B illustrate an electronic display 1000 with a particular graphical visualization.

As shown, the electronic display 1000 includes the ballistic profile 902 and the environmental conditions 904 discussed above. In addition, the electronic display 1000 includes BDC 1002 and target distance indicators 1004. In this arrangement, the BDC 1002 are indexed rotational points (e.g., MOA values) that correspond to a given target distance. For instance, at zero MOA (indicated by the value "0" in the BDC 1002), an optical assembly is sighted for a target distance of 200 yards. Similarly, at one MOA (indicated by the value "1" in the BDC 1002), an optical assembly is sighted for a target distance of about 270-275 yards. Further, at 1.5 MOA, (indicated by the second hash mark between "1" and "2" in the BDC 1002), an optical assembly is sighted for a target distance of about 300 yards (indicated by the value "300" in the target distance indicators 1004), and so forth.

Figure 11A:
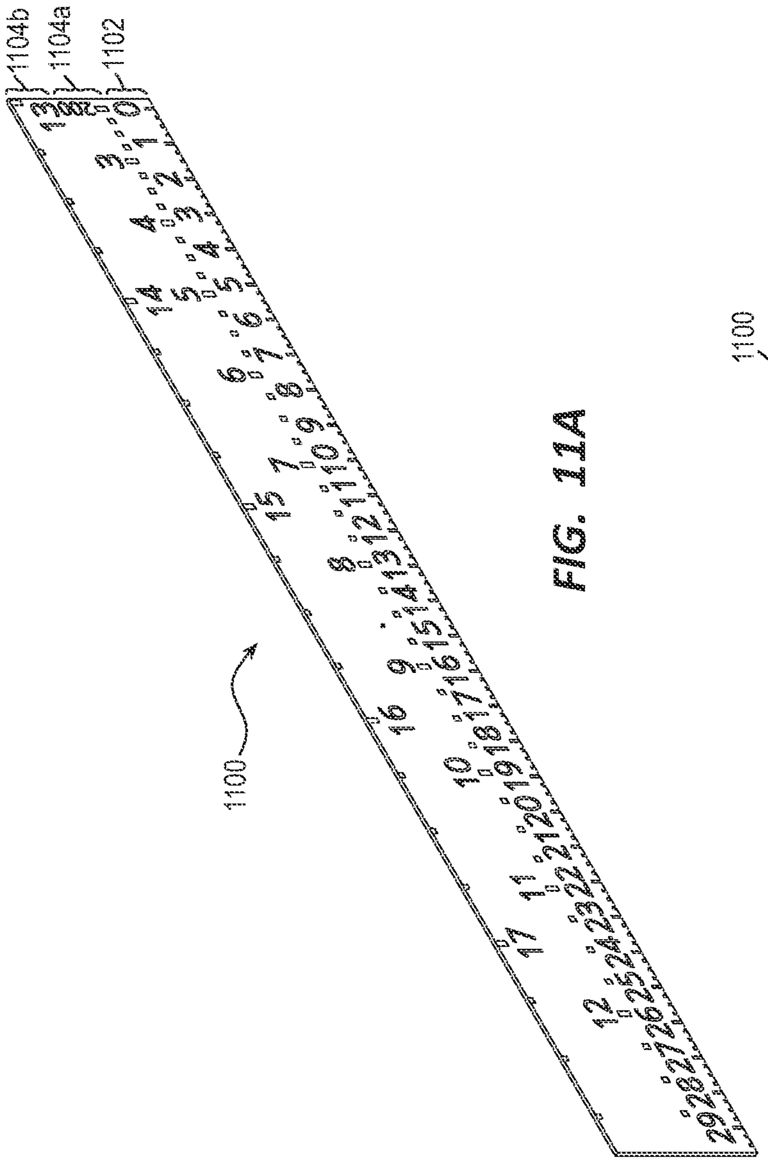
FIGS. 11A-11B illustrate yet another example electronic display.
Figure 11B:
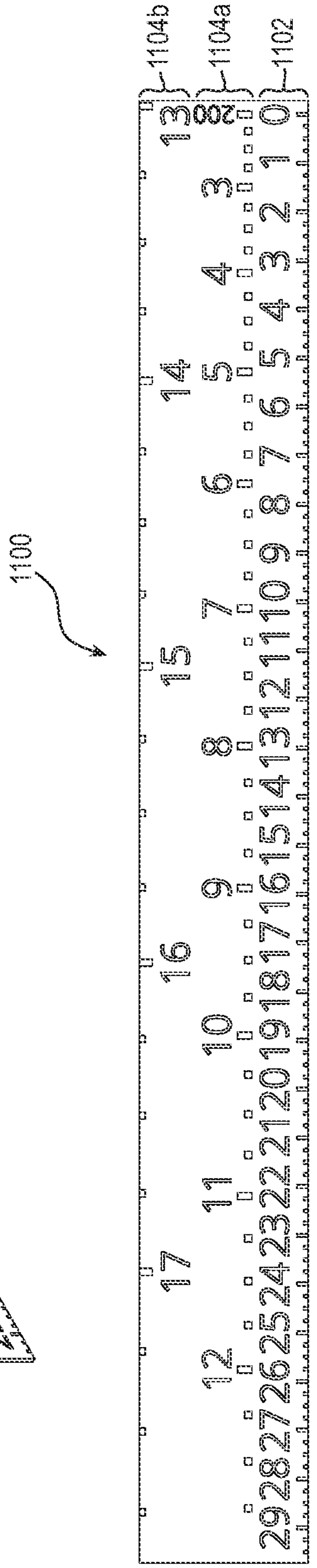

As just discussed, the elevation turret 102 can present graphical visualizations that include one or more of a ballistic profile, distance compensation data, environmental conditions, turret settings, etc. In accordance with one or more such embodiments, FIGS. 11A-11B illustrate yet another example of the electronic display 104 discussed above. In particular, FIGS. 11A-11B illustrate an electronic display 1100 with a particular graphical visualization.

As shown, the electronic display 1100 includes BDC 1102, which is the same as or similar to the BDC 1002 of FIGS. 10A-10B. Different from the electronic display 1000, however, the electronic display 1100 includes multiple rows of target distance indicators (i.e., target distance indicators 1104*a*-1104*b*). The target distance indicators 1104*a* correspond to 200 yards (at 0 MOA adjustment per the BDC 1102) to about 1299 yards (at about 29.75 MOA per the BDC 1102).

The target distance indicators 1104*b* begin at a target distance of 1300 yards (i.e. the indicated value "13"). When starting along the target distance indicators 1104*b* at 1300 yards, the BDC 1102 starts back at the "0" value (which actually corresponds to 30 MOA at one full revolution of the scope turret). In addition, the target distance indicators 1104*b* span to a target distance of almost 1800 yards (which corresponds to almost 60 MOA at two turret revolutions per the BDC 1102).

It will be appreciated that any of the values, metrics, indicators, etc. (including a spacing therebetween) illustrated in FIGS. 9A-9B, 10A-10B, 11A-11B can be modified, omitted, or added thereto for different ballistic profiles, different environmental conditions, and/or calibration settings. Indeed, BDC values for one ballistic profile can be different for another ballistic profile. Likewise, turret clicks for a scope turret calibrated for 20 MOA per revolution can be different for a scope turret calibrated for 40 MOA per revolution.

Figure 12A:
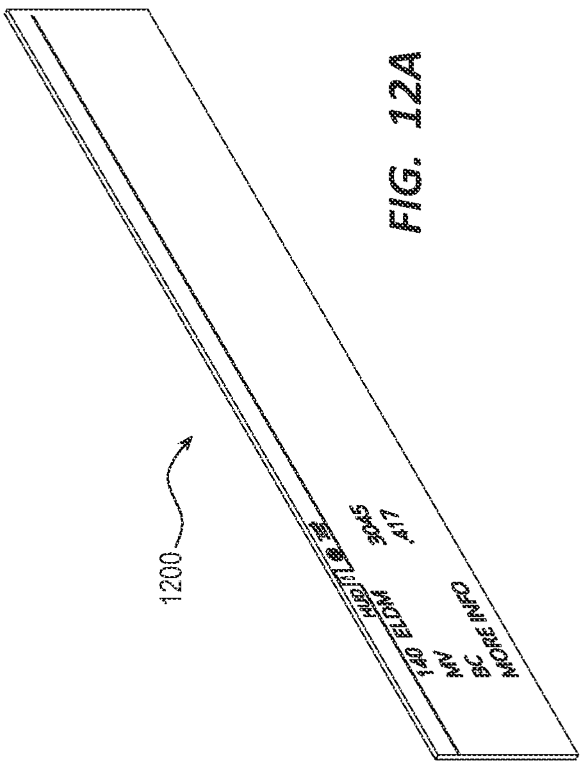
FIGS. 12A-12B illustrate an additional example of an electronic display.
Figure 12B:
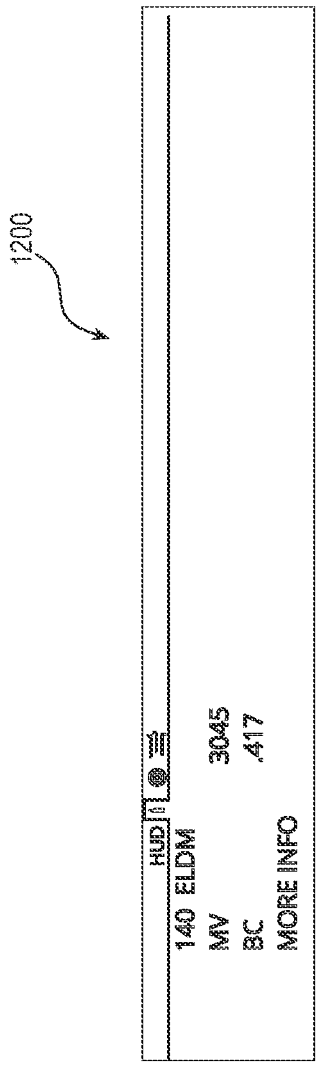

As discussed above, the elevation turret 102 can present a variety of different graphical visualizations, including menus, tabs, folders, etc. These items can be selectable or navigable, as may be desired. In accordance with one or more such embodiments, FIGS. 12A-12B illustrate an example of the electronic display 104 discussed previously. In particular, FIGS. 12A-12B include an electronic display 1200. The electronic display 1200 specifically includes a ballistic profile tab or window that provides additional detail to the ballistic profile 902 discussed above. For instance, as shown in FIGS. 12A-12B, the electronic display 1200 includes a muzzle velocity of "3045" and a ballistic coefficient of "0.417." Further, the electronic display 1200 includes a selectable menu option "MORE INFO" that, upon user selection, can cause the electronic display 1200 to provide additional or alternative aspects of a ballistic profile.

Figure 13A:
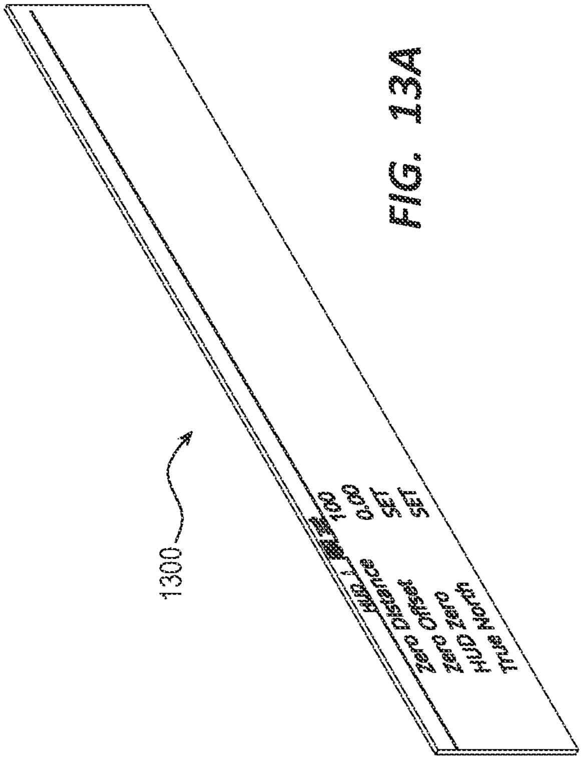
FIGS. 13A-13B illustrate an example of an electronic display.
Figure 13B:
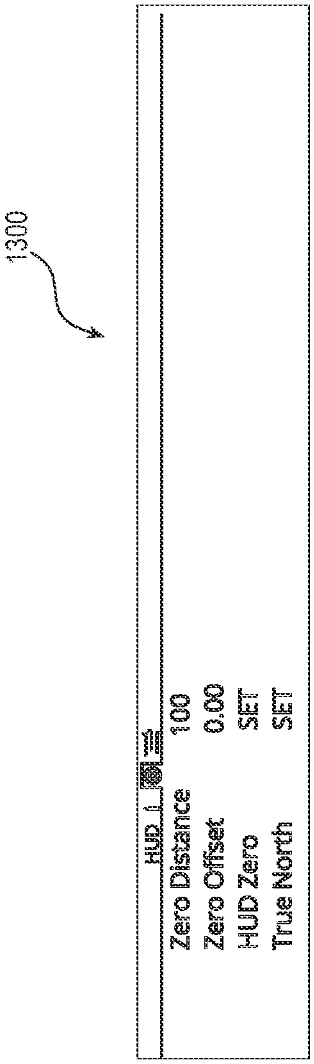

In accordance with one or more embodiments of the present disclosure, FIGS. 13A-13B illustrate another example of the electronic display 104 discussed previously. In particular, FIGS. 13A-13B include an electronic display 1300. The electronic display 1300 specifically includes one or more turret settings. For instance, as shown in FIGS. 13A-13B, the electronic display 1300 includes a "Zero Distance" setting of "100" yards that the optical assembly is sighted in for without BDC adjustment. Further, the electronic display 1300 includes a "Zero Offset" of "0.00" indicating that no BDC has been applied to the Zero Distance. For instance, a zero offset can include 2 inches high at 100 yards.

The "HUD Zero" setting indicates a value of "SET," representing the ability to configure where along the electronic display 1300 that the zero mark should be positioned. The "HUD Zero" can be set, modified, etc. upon sighting in a scope. In addition, the electronic display 1300 includes a "True North" setting that indicates a value of "SET"—representing the ability to similarly configure a compass setting of True North.

Myriad other turret settings and calibrations are herein contemplated. Indeed, the turret settings shown in FIGS. 13A-13B are merely illustrative.

Figure 14A:
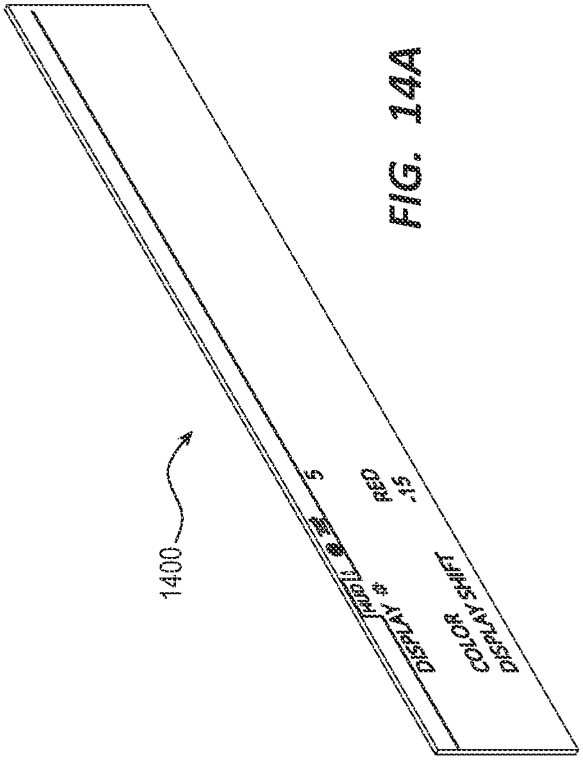
FIGS. 14A-14B illustrate another example electronic display.
Figure 14B:
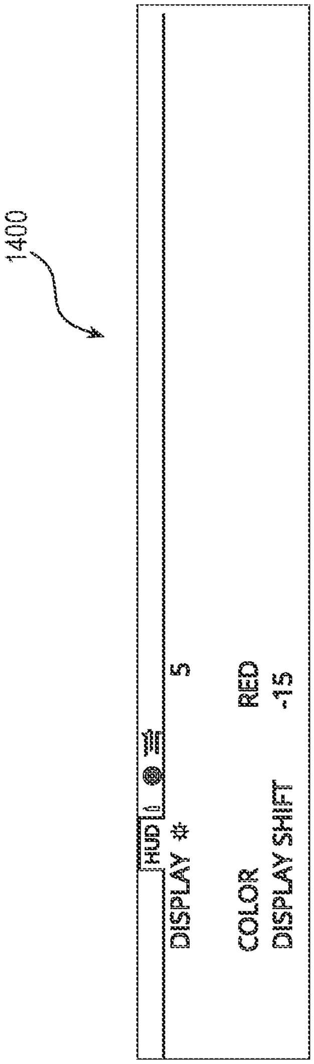

FIGS. 14A-14B illustrate yet another example of the electronic display 104 discussed previously. In particular, FIGS. 14A-14B include an electronic display 1400. The electronic display 1400 specifically includes one or more display settings. For example, the "DISPLAY" option can be used to modify a display brightness (e.g., between levels 1-9). Further, the "COLOR" option can be used to modify a display color (e.g., to black, white, red, cyan, magenta, yellow, blue, green, etc.). Similarly, the "DISPLAY SHIFT" option can be used to shift the pixels side-to-side or up and down (e.g., +/−31 pixels).

Myriad other display settings are herein contemplated. Indeed, the display settings shown in FIGS. 14A-14B are merely illustrative. Moreover, other types of settings, menus, tabs, and windows are within the scope of this disclosure. For example, an electronic display of the present application can include an environment settings menu, a power management menu, a BlueTooth® menu, a setup wizard menu, etc.

Any of the features, components, and/or parts, including the arrangements and configurations of an electronic display shown in FIGS. 9A-9B, 10A-10B, 11A-11B, 12A-12B, 13A-13B, and 14A-14B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 9A-9B, 10A-10B, 11A-11B, 12A-12B, 13A-13B, and 14A-14B.

As mentioned above, the electronic display 104 can include a connector for communicatively coupling the electronic display 104 to the PCB 308. A connector can include myriad different shapes, sizes, configurations, materials, wiring, ranges of flexibility, etc. Additionally, a connector can be located in a variety of different places along the electronic display 104. In accordance with one or more such embodiments, FIGS. 15A-15B illustrate an example of the electronic display 104 discussed above. In particular, FIGS. 15A-15B show an electronic display 1500 that includes a connector 1502. The connector 1502 differs from the connector 316 discussed above that stemmed from the tip end of the electronic display 104. Here, the connector 1502 stems from a top edge 1504. In particular, the connector 1502 proceeds from the top edge 1504 and then doglegs away from the electronic display 1500. By doglegging away from the top edge 1504, the connector 1502 can then connect to the display mount 312 (as similarly discussed above).

It will be appreciated that the connector 1502 can include myriad different connections and shape profiles. In some embodiments, the connector 1502 includes a shape profile that matches or is similar to the electronic display 1500 (e.g., thin, rectangular). Similarly, in certain implementations, the connector 1502 matches the contour of the connector 1502 by tightly wrapping at least partially around a circumference of the electronic display 1500 (when positioned on the elevation turret 102). As another example, the connector 1502 wraps around a turret body and underneath a portion of the display. In other embodiments, the connector 1502 includes a different shape profile and/or a different contour. For example, the connector 1502 includes a wire cable connection (e.g., with a round profile). As another example, the connector 1502 may be loose, slackened, or adjustably attached to the electronic display 1500. In yet another example, the connector 1502 may be removably attached to the electronic display 1500.

Additionally or alternatively, in certain implementations, the connector 1502 comprises a flexible portion. In some embodiments, the connector 1502 comprises a rigid portion. In one or more embodiments, the connector 1502 comprises both a flexible portion and a rigid portion.

Any of the features, components, and/or parts, including the arrangements and configurations thereof shown in FIGS. 15A-15B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 15A-15B.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed.

It will be apparent to one of ordinary skill in the art that many modifications and variations are possible in view of the above teachings. Indeed, various inventions have been described herein with reference to certain specific aspects and examples. However, they will be recognized by those skilled in the art that many variations are possible without departing from the scope and spirit of the inventions disclosed herein. Specifically, those inventions set forth in the claims below are intended to cover all variations and modifications of the inventions disclosed without departing from the spirit of the inventions. The terms "including" or "includes" as used in the specification shall have the same meaning as the term "comprising."

What is claimed is:

1. A turret of a scope, comprising:

a cap;

a turret body connected to the cap;

an electronic display wrapped circumferentially around the turret body; and an actuator to engage the electronic display.

2. The turret of claim 1, wherein:

the actuator is a button; and upon depressing the button, the electronic display presents a graphical visualization.

3. The turret of claim 2, wherein the graphical visualization comprises at least one of distance compensation data or a ballistic profile.

4. The turret of claim 3, wherein the graphical visualization comprises multiple ballistic profiles, at least one ballistic profile being selectable via additional user interaction with the button.

5. The turret of claim 1, wherein upon actuating the actuator, the electronic display powers on and is wirelessly connectable with an external device.

6. The turret of claim 5, wherein upon being wirelessly connected, the electronic display presents a graphical visualization based on distance compensation data or a ballistic profile received from the external device.

7. The turret of claim 1, wherein the electronic display comprises an electronic ink interface.

8. A scope comprising:

an optical assembly;

a windage turret to laterally adjust the optical assembly; and an elevation turret to vertically adjust the optical assembly, the elevation turret comprising a digital display configured to present graphical visualizations, wherein the digital display is coupled to the elevation turret so that the digital display and elevation turret rotate together.

9. The scope of claim 8, wherein the elevation turret further comprises:

a cap;

a turret body connected to the cap;

a button positioned on or through a top surface of the cap;

a printed circuit board (PCB) electrically or mechanically coupled to the button, wherein interaction with the button causes the PCB to engage the digital display; and a battery providing power to the digital display via the PCB.

10. The scope of claim 9, wherein the elevation turret further comprises a connector assembly coupling the digital display and the PCB.

11. The scope of claim 10, wherein the connector assembly comprises:

a display mount attached to the PCB; and a flex connection between the display mount and the digital display.

12. The scope of claim 8, wherein the digital display is coupled to a side surface of the elevation turret.

13. The scope of claim 8, wherein the digital display spans an entire circumference of the elevation turret.

14. The scope of claim 8, wherein the digital display presents at least one of numbers or hash marks representing adjustment metrics to the optical assembly in milliradians or minutes of angle.

15. The scope of claim 8, wherein the digital display presents at least one of a rifle caliber, an ammunition load, or an environmental condition.

* * * * *